US012600147B2

(12) United States Patent
Tamaki

(10) Patent No.: US 12,600,147 B2
(45) **Date of Patent: *Apr. 14, 2026**

(54) PRETREATMENT DEVICE

(71) Applicant: BROTHER KOGYO KABUSHIKI KAISHA, Nagoya (JP)

(72) Inventor: Shuichi Tamaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,339

(22) Filed: Apr. 27, 2023

(65) Prior Publication Data

US 2023/0256762 A1 Aug. 17, 2023

Related U.S. Application Data

(63) Continuation of application No. 16/140,819, filed on Sep. 25, 2018, now Pat. No. 11,673,417.

(30) Foreign Application Priority Data

Sep. 29, 2017 (JP) ................................ 2017-192131

(51) Int. Cl.
*B05B 12/12* (2006.01)
*B05B 12/00* (2018.01)
(Continued)

(52) U.S. Cl.
CPC ............. *B41J 3/4078* (2013.01); *B05B 12/00* (2013.01); *B05B 12/126* (2013.01); (Continued)

(58) Field of Classification Search
None
See application file for complete search history.

(56) References Cited

U.S. PATENT DOCUMENTS 6,189,989 B1 * 2/2001 Hirabayashi ........... B41J 3/4078 347/43
2002/0028319 A1 3/2002 Hirabayashi et al.
(Continued)

FOREIGN PATENT DOCUMENTS

EP 3121016 A1 1/2017
JP 2005232633 A 9/2005
(Continued)

OTHER PUBLICATIONS

New U.S. patent application claiming priority to JP Application No. 2017-192097 being filed concurrently on Sep. 25, 2018 (Client Reference Nos. 2017-00680US00/17222BRY21). (47 pages).
(Continued)

*Primary Examiner* — Binu Thomas
(74) *Attorney, Agent, or Firm* — HOGAN LOVELLS US LLP

(57) ABSTRACT

A pretreatment device includes a platen, guide that guide a conveyance of the platen from a set position at which a recorded medium is set on an upper surface, a spray that sprays a pretreatment agent onto the recording medium set on an upper surface of the platen, an input portion into which is input at least one of an application range of the pretreatment agent onto the recording medium or an application amount of the pretreatment agent, a processor; and a memory storing computer-readable instructions. The computer-readable instructions also includes setting, on the basis of at least one of the application range or the application amount input into the input portion, at least one of a conveyance speed of the platen or a spray duty ratio that is a ratio of a spray time during a spray period of the pretreatment agent.

5 Claims, 23 Drawing Sheets

(51) Int. Cl.

| | |
|---|---|
| ***B41J 3/407*** | (2006.01) |
| ***B41J 11/00*** | (2006.01) |
| ***B41J 11/06*** | (2006.01) |
| ***B41M 5/00*** | (2006.01) |

(52) U.S. Cl.
CPC ............ *B41J 11/0015* (2013.01); *B41J 11/06* (2013.01); *B41M 5/0017* (2013.01); *B05B 12/124* (2013.01); *B41M 5/0011* (2013.01)

(56) References Cited

U.S. PATENT DOCUMENTS

| | | | | |
|---|---|---|---|---|
| 2005/0174412 | A1* | 8/2005 | Codos | B41J 3/4078 347/102 |
| 2005/0179708 | A1 | 8/2005 | Ben-Zur | |
| 2009/0244634 | A1* | 10/2009 | Hasegawa | B41J 2/04535 358/3.23 |
| 2010/0001099 | A1 | 1/2010 | Onda | |
| 2012/0251795 | A1 | 10/2012 | Okada et al. | |
| 2013/0076814 | A1 | 3/2013 | Kanaya et al. | |
| 2013/0278692 | A1 | 10/2013 | Marino et al. | |
| 2014/0020189 | A1 | 1/2014 | Weibel et al. | |
| 2014/0192121 | A1 | 7/2014 | Bannai et al. | |
| 2015/0044372 | A1 | 2/2015 | Okada et al. | |
| 2015/0251444 | A1* | 9/2015 | Sayama | B41J 3/4078 347/16 |
| 2015/0273866 | A1 | 10/2015 | Sakai | |
| 2015/0314615 | A1 | 11/2015 | Humet et al. | |
| 2016/0303872 | A1 | 10/2016 | Okuda et al. | |
| 2017/0008276 | A1 | 1/2017 | Humet et al. | |
| 2017/0015113 | A1 | 1/2017 | Yamashita | |
| 2017/0314177 | A1 | 11/2017 | Komiya | |
| 2017/0334196 | A1 | 11/2017 | Petschik | |
| 2018/0207954 | A1* | 7/2018 | Schiestl | B41J 3/4078 |
| 2019/0329579 | A1 | 10/2019 | Okuda et al. | |

FOREIGN PATENT DOCUMENTS

| | | | |
|---|---|---|---|
| JP | 2009209493 | A | 9/2009 |
| JP | 2009234219 | A | 10/2009 |
| JP | 2009255509 | A | 11/2009 |
| JP | 2012207338 | A | 10/2012 |
| JP | 2013067925 | A | 4/2013 |
| JP | 2015183331 | A | 10/2015 |
| JP | 2015183339 | A | 10/2015 |
| JP | 2015189102 | A | 11/2015 |
| JP | 2016501748 | A | 1/2016 |
| JP | 2016044363 | A | 4/2016 |
| JP | 2016199001 | A | 12/2016 |
| JP | 2017197891 | A | 11/2017 |
| WO | 2017012879 | A1 | 1/2017 |

OTHER PUBLICATIONS

Extended European Search Report issued in connection with related European Application No. 18195538.6, dated Mar. 4, 2019. (9 pages).

Office Action issued on Feb. 3, 2020 in connection with related U.S. Appl. No. 16/141,196.

Final Office Action issued on Jul. 16, 2020 in corresponding U.S. Appl. No. 16/141,196.

Japanese Office Action mailed Sep. 28, 2021 in corresponding Japanese application No. 2017-192131 (8 pages).

Japanese Office Action mailed Sep. 28, 2021 in Japanese application No. 2017-192097 (8 pages).

* cited by examiner

FIG. 12

T1

| SPRAY | (1) | (2) | (3) | (4) | (5) | (6) | (7) |
|---|---|---|---|---|---|---|---|
| APPLICATION SECTION | [0, a] | [a, b] | [b, c] | [c, d] | [d, e] | [e, f] | [f, g] |

FIG. 13

T2

L1

| PLATEN CONVEYANCE SPEED (SLOW → FAST) \ SPRAY DUTY RATIO (%) (INTERMITTENT → CONTINUOUS) | 10 | 20 | 30 | 40 | 50 | 60 | 70 | 80 | 90 | 100 |
|---|---|---|---|---|---|---|---|---|---|---|
| 1 | 10 | 20 | 30 | 40 | 50 | 60 | 70 | 80 | 90 | 100 |
| 2 | 9 | 18 | 27 | 36 | 45 | 54 | 63 | 72 | 81 | 90 |
| 3 | 8 | 16 | 24 | 32 | 40 | 48 | 56 | 64 | 72 | 80 |
| 4 | 7 | 14 | 21 | 28 | 35 | 42 | 49 | 56 | 63 | 70 |
| 5 | 6 | 12 | 18 | 24 | 30 | 36 | 42 | 48 | 54 | 60 |
| 6 | 5 | 10 | 15 | 20 | 25 | 30 | 35 | 40 | 45 | 50 |
| 7 | 4 | 8 | 12 | 16 | 20 | 24 | 28 | 32 | 36 | 40 |
| 8 | 3 | 6 | 9 | 12 | 15 | 18 | 21 | 24 | 27 | 30 |
| 9 | 2 | 4 | 6 | 8 | 10 | 12 | 14 | 16 | 18 | 20 |
| 10 | 1 | 2 | 3 | 4 | 5 | 6 | 7 | 8 | 9 | 10 |

FIG. 15A

| | | STEP RANGE |
|---|---|---|
| SPRAY | TYPE | 100-1600 |
| (1) | SPRAY DUTY RATIO | 40 |
| | CONVEYANCE SPEED | 6 |
| (2) | SPRAY DUTY RATIO | 40 |
| | CONVEYANCE SPEED | 6 |
| (3) | SPRAY DUTY RATIO | 40 |
| | CONVEYANCE SPEED | 6 |
| (4) | SPRAY DUTY RATIO | 40 |
| | CONVEYANCE SPEED | 6 |
| (5) | SPRAY DUTY RATIO | 40 |
| | CONVEYANCE SPEED | 6 |
| (6) | SPRAY DUTY RATIO | 40 |
| | CONVEYANCE SPEED | 6 |
| (7) | SPRAY DUTY RATIO | 40 |
| | CONVEYANCE SPEED | 6 |

FIG. 15B

| SPRAY | TYPE | STEP RANGE 100-200 | 200-1500 | 1500-1600 |
|---|---|---|---|---|
| (1) | SPRAY DUTY RATIO | 0 | 0 | 0 |
| | CONVEYANCE SPEED | 5 | 5 | 5 |
| (2) | SPRAY DUTY RATIO | 0 | 50 | 0 |
| | CONVEYANCE SPEED | 5 | 5 | 5 |
| (3) | SPRAY DUTY RATIO | 0 | 50 | 0 |
| | CONVEYANCE SPEED | 5 | 5 | 5 |
| (4) | SPRAY DUTY RATIO | 0 | 50 | 0 |
| | CONVEYANCE SPEED | 5 | 5 | 5 |
| (5) | SPRAY DUTY RATIO | 0 | 50 | 0 |
| | CONVEYANCE SPEED | 5 | 5 | 5 |
| (6) | SPRAY DUTY RATIO | 0 | 50 | 0 |
| | CONVEYANCE SPEED | 5 | 5 | 5 |
| (7) | SPRAY DUTY RATIO | 0 | 0 | 0 |
| | CONVEYANCE SPEED | 5 | 5 | 5 |

FIG. 16

| SPRAY | TYPE | STEP RANGE 100-400 | 400-700 | 700-1600 |
|---|---|---|---|---|
| (1) | SPRAY DUTY RATIO | 0 | 0 | 0 |
| | CONVEYANCE SPEED | 6 | 6 | 6 |
| (2) | SPRAY DUTY RATIO | 0 | 0 | 0 |
| | CONVEYANCE SPEED | 6 | 6 | 6 |
| (3) | SPRAY DUTY RATIO | 0 | 0 | 0 |
| | CONVEYANCE SPEED | 6 | 6 | 6 |
| (4) | SPRAY DUTY RATIO | 0 | 20 | 0 |
| | CONVEYANCE SPEED | 6 | 6 | 6 |
| (5) | SPRAY DUTY RATIO | 0 | 20 | 0 |
| | CONVEYANCE SPEED | 6 | 6 | 6 |
| (6) | SPRAY DUTY RATIO | 0 | 20 | 0 |
| | CONVEYANCE SPEED | 6 | 6 | 6 |
| (7) | SPRAY DUTY RATIO | 0 | 0 | 0 |
| | CONVEYANCE SPEED | 6 | 6 | 6 |

PRETREATMENT DEVICE

CROSS-REFERENCE TO RELATED APPLICATION

This application is a continuation of U.S. patent application Ser. No. 16/140,819, filed on Sep. 25, 2018, which issued as U.S. Pat. No. 11,673,417 and claims priority to Japanese Patent Application No. 2017-192131 filed Sep. 29, 2017. The contents of the foregoing application are hereby incorporated by reference.

BACKGROUND

The present disclosure relates to a pretreatment device.

A recording device is known that is provided with a tray, on which a cloth is placed, and a spray head that sprays a pretreatment agent in order to improve a fixing performance of ink. In the recording device, the spray head sprays the pretreatment agent onto the cloth while the tray moves from the rear to the front. As a result, the pretreatment agent is applied to the cloth.

SUMMARY

However, in some cases, a region to which the pretreatment agent is applied, or an amount of the pretreatment agent to be applied to the cloth differs depending on the cloth. In this case, when a conveyance speed of the tray and a spray duty ratio, which is a ratio of a spray time during a pretreatment agent spray period, are constant, there is a possibility that the recording device may not be able to respond to a longer pretreatment time, or a change in an application amount of the pretreatment agent.

Embodiments of the broad principles derived herein provide a pretreatment device that is capable of shortening a pretreatment time period or changing an application amount of a pretreatment agent.

The embodiments herein provide a pretreatment device includes a platen, a guide that guides a conveyance of the platen from a set position at which a recorded medium is set on an upper surface of the platen, a spray that sprays a pretreatment agent onto the recording medium set on an upper surface of the platen guided in a first direction by the guide, an input portion into which is input at least one of an application range of the pretreatment agent onto the recording medium or an application amount of the pretreatment agent, a processor, and a memory storing computer-readable instructions. The computer-readable instructions, when executed by the processor, instruct the processor to perform processes comprising, setting, on the basis of at least one of the application range or the application amount input into the input portion, at least one of a conveyance speed of the platen or a spray duty ratio that is a ratio of a spray time during a spray period of the pretreatment agent.

BRIEF DESCRIPTION OF THE DRAWINGS

Embodiments will be described below in detail with reference to the accompanying drawings in which:

FIG. 12 is a diagram showing a first table;

FIG. 13 is a diagram showing a second table;

FIG. 15A is a diagram showing parameters of each of the sprays with respect to the specific example shown in FIG. 14;

FIG. 15B is a diagram showing parameters of each of the sprays with respect to the specific example shown in FIG. 14;

FIG. 16 is a diagram showing parameters of each of the sprays with respect to the specific example shown in FIG. 14;

DETAILED DESCRIPTION

Figure 1:
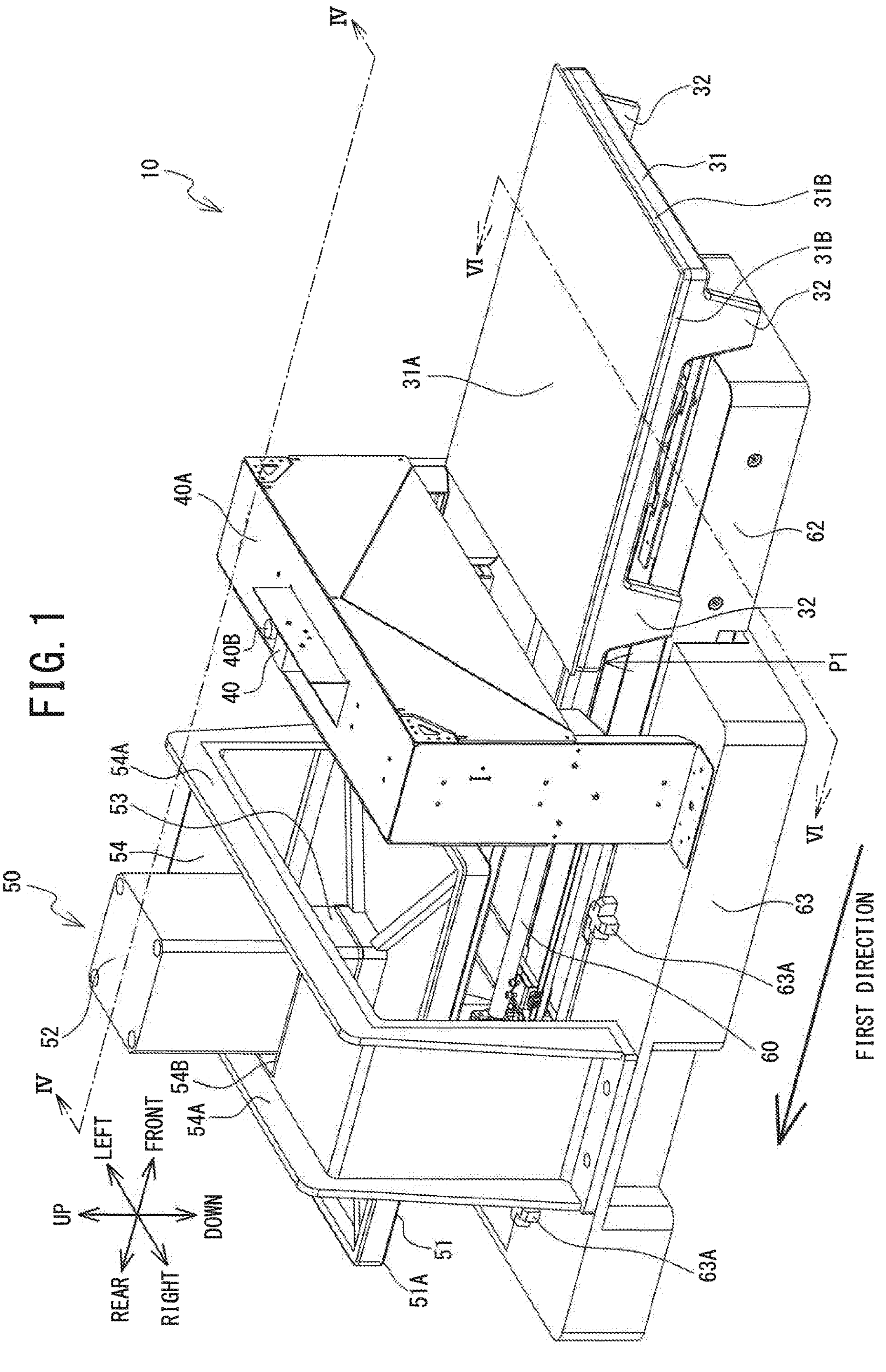
FIG. 1 is a perspective view showing an outline configuration of a pretreatment device 10.

A pretreatment device 10 of the present disclosure will be explained with reference to the drawings. A pretreatment device 10 of a present disclosure will be explained with reference to the drawings. An upper right side, a lower left side, a lower right side, an upper left side, a left side, and a right side in FIG. 1 are, respectively, a front side, a rear side, a right side, a left side, an upper side, and a lower side of the pretreatment device 10. The pretreatment device 10 is a device that performs pretreatment to apply a pretreatment agent, before print processing by an inkjet printer (not shown in the drawings) on a cloth that is an example of a recording medium. As a result of the pretreatment on the cloth, color development quality rises of color inks applied from the inkjet printer onto the cloth.

Configuration of Pretreatment Device 10

As shown in FIG. 1, the pretreatment device 10 is provided, in the direction from the front to the rear (hereinafter referred to as a "first direction") of the pretreatment device 10, with a platen 31 on which the cloth is placed, an application portion 40 that applies the pretreatment agent on the cloth, and a heat press portion 50 that dries the cloth to which the pretreatment agent has been applied. Examples of a material of the cloth include cotton, polyester, a cotton/ polyester mix, and the like. The pretreatment agent improves the color development of color inks. Examples of the pretreatment agent include an aqueous solution that includes a metal salt of $CaCl_2$) or the like. By applying pressure to the cloth at a high temperature and drying the pretreatment agent, the heat press portion 50 improves fixing of the pretreatment agent on the cloth and improves image quality. Note that, a direction in which the platen 31 is guided at an application position P2 is the first direction, the first direction is the rear direction in the direction from the front to the rear of the pretreatment device 10 in the present embodiment. Further, the direction of the position of the application position P2 to be described later with respect to the set position P1 to be described later is not limited to the rear direction but may be the left rear direction, for example.

As shown in FIG. 1, the platen 31 disposed at a set position P1, the application portion 40, and the heat press portion 50 are arranged in order in the first direction of the pretreatment device 10. The set position P1 is a position at which the cloth is placed on the platen 31, and as an example, is a position at which the platen 31 has moved furthest to the front. Specifically, the heat press portion 50 is disposed in a position furthest from the set position P1 in the first direction. A press operation using a high temperature is referred to below as a "heat press operation." In addition to the configuration described below, the heat press may also be a pressure roller that presses the cloth using a high temperature roller.

The upper surface of the platen 31 is a substantially rectangular shape that is long in the first direction. A plate-shaped porous member 31A, which is substantially the same size as the upper surface of the platen 31, is placed on the upper surface of the platen 31. Examples of the porous member 31A include a sponge, a mesh material, steel wool, glass wool, rock wool, felt, and the like, and the porous member 31A is a member that internally contains many spaces. Since the porous member 31A internally contains the many spaces, the porous member 31A improves the release of steam resulting from moisture content included in the pretreatment agent at the time of the heat press operation. As shown in FIG. 2B, the platen 31 is provided, respectively, with plate-shaped leg portions 32 that protrude downward and that are long in the front-rear direction, at each of end portions on the two long sides of the lower surface of the platen 31. Each of the leg portions 32 is a substantially trapezoid shape that is tapered downward. Preferably, at least three of the leg portions 32 are provided, and four are provided in the present embodiment. The lower surface of each of the leg portions 32 is parallel to the upper surface of the platen 31. A length in the up-down direction of each of the leg portions 32 is the same.

Figure 2A:
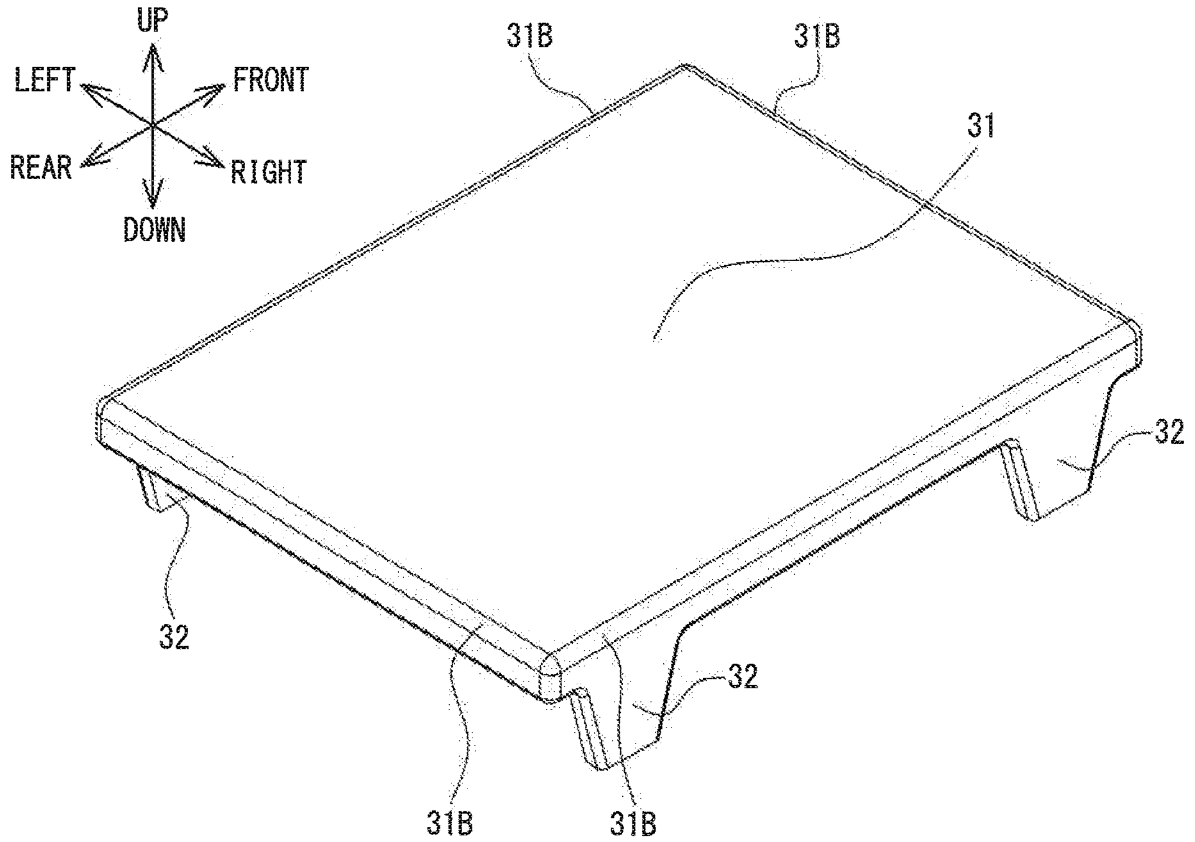
FIG. 2A is a perspective view of an upper surface of a platen 31.
Figure 2B:
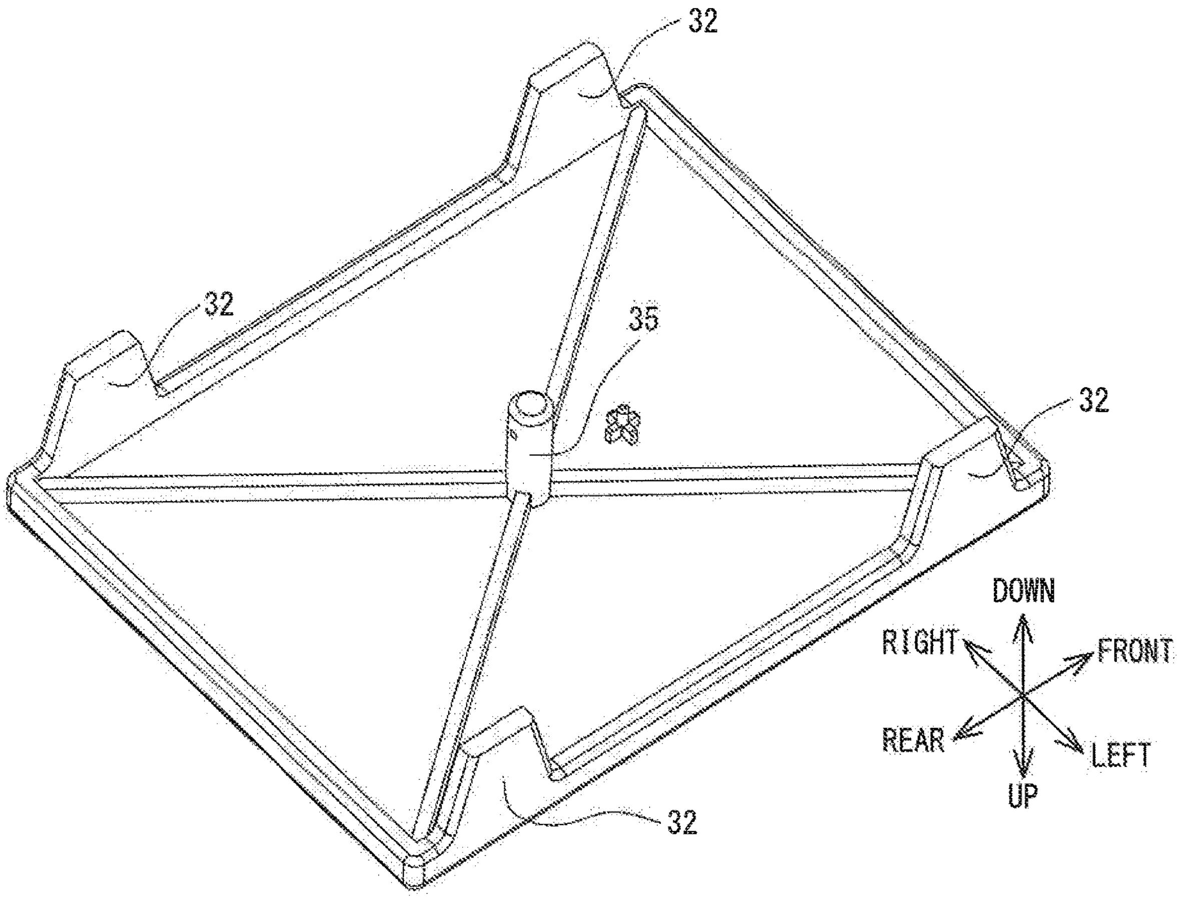
FIG. 2B is a perspective view of a back surface of the platen 31.
Figure 3:
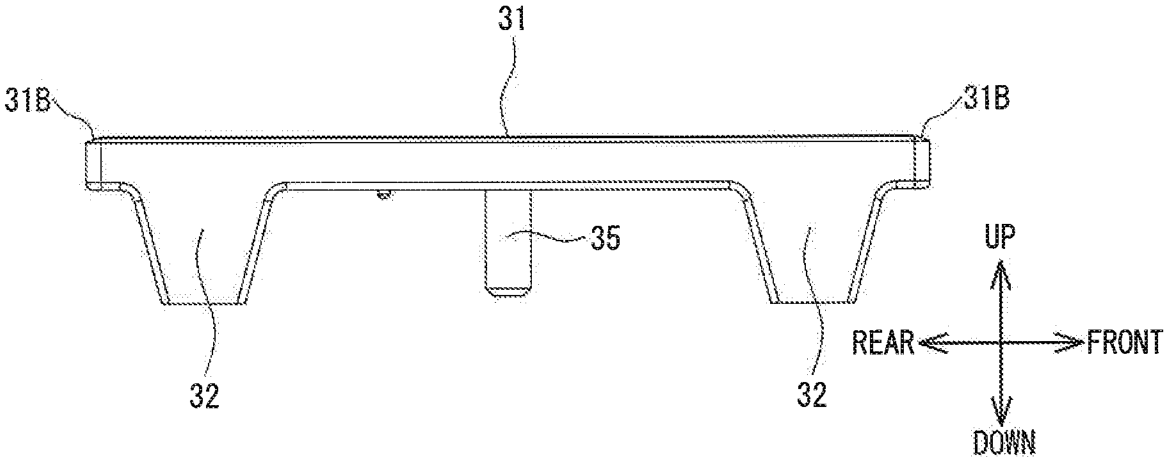
FIG. 3 is a side view of the platen 31 of a modified example.

As shown in FIG. 2A, each of end portions 31B in the front-rear direction and the left-right direction of the upper surface of the platen 31 are formed so as to be rounded downward (a curved surface). Note that, as shown in FIG. 3, each of the end portions 31B of the upper surface of the platen 31 may be formed so as to be a tapered portion that is inclined downward in a tapered shape. Further, some of the end portions 31 of the upper surface of the platen 31 may be formed in the downward rounded shape (the curved surface), and the other end portions 31B may be formed as the tapered portions. Further, at least one of the end portions 31B of the upper surface of the platen 31 may be formed in the downward rounded shape (the curved surface), and then formed as the downwardly inclined tapered portion from the lower end of the rounded shape.

Figure 4:
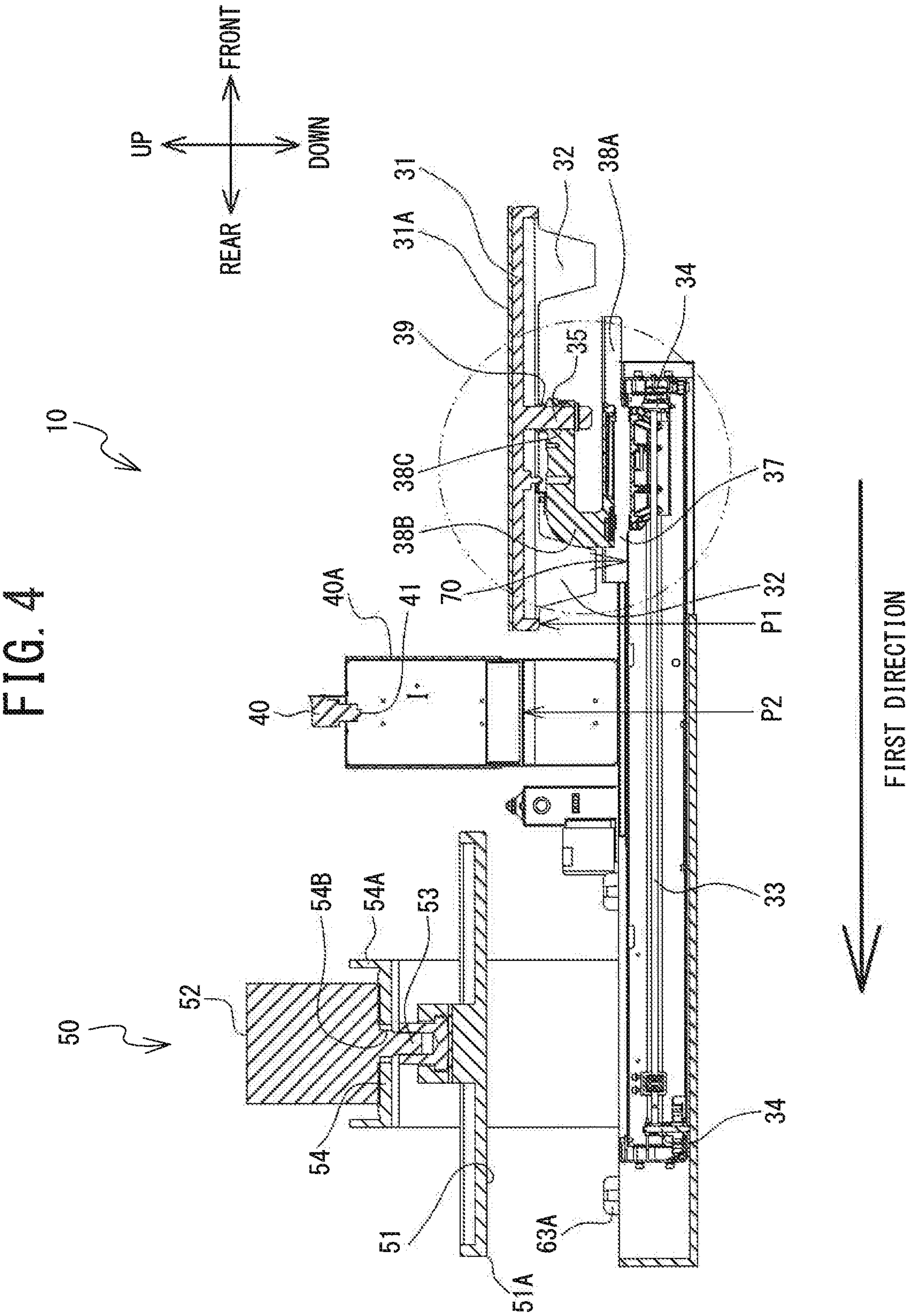
FIG. 4 is a cross-sectional view of the pretreatment device 10 along a line IV-IV shown in FIG. 1.

The pretreatment device 10 is provided, below the platen 31, with a platen conveyance mechanism 70 (refer to FIG. 7), which conveys the platen 31 in the front-rear direction. The platen conveyance mechanism 70 is provided extending in the first direction from the front portion of the pretreatment device 10, and is provided with two guides 60 (refer to FIG. 7) that are arranged so as to be aligned to the left and to the right. The guide 60 is a cylindrical metal rod, for example. The platen 31 moves in the front-rear direction along the two guides 60. As shown in FIG. 4, the platen conveyance mechanism 70 is provided with the two guides 60 (refer to FIG. 7), a belt 33, a pulley 34, a support portion 37, a platen motor 15 (refer to FIG. 10), and the like. The platen motor 15 is a stepping motor, for example. As shown in FIG. 2B, a cylindrically shaped coupling portion 35 is provided in a central portion of the lower surface of the platen 31.

Figure 5:
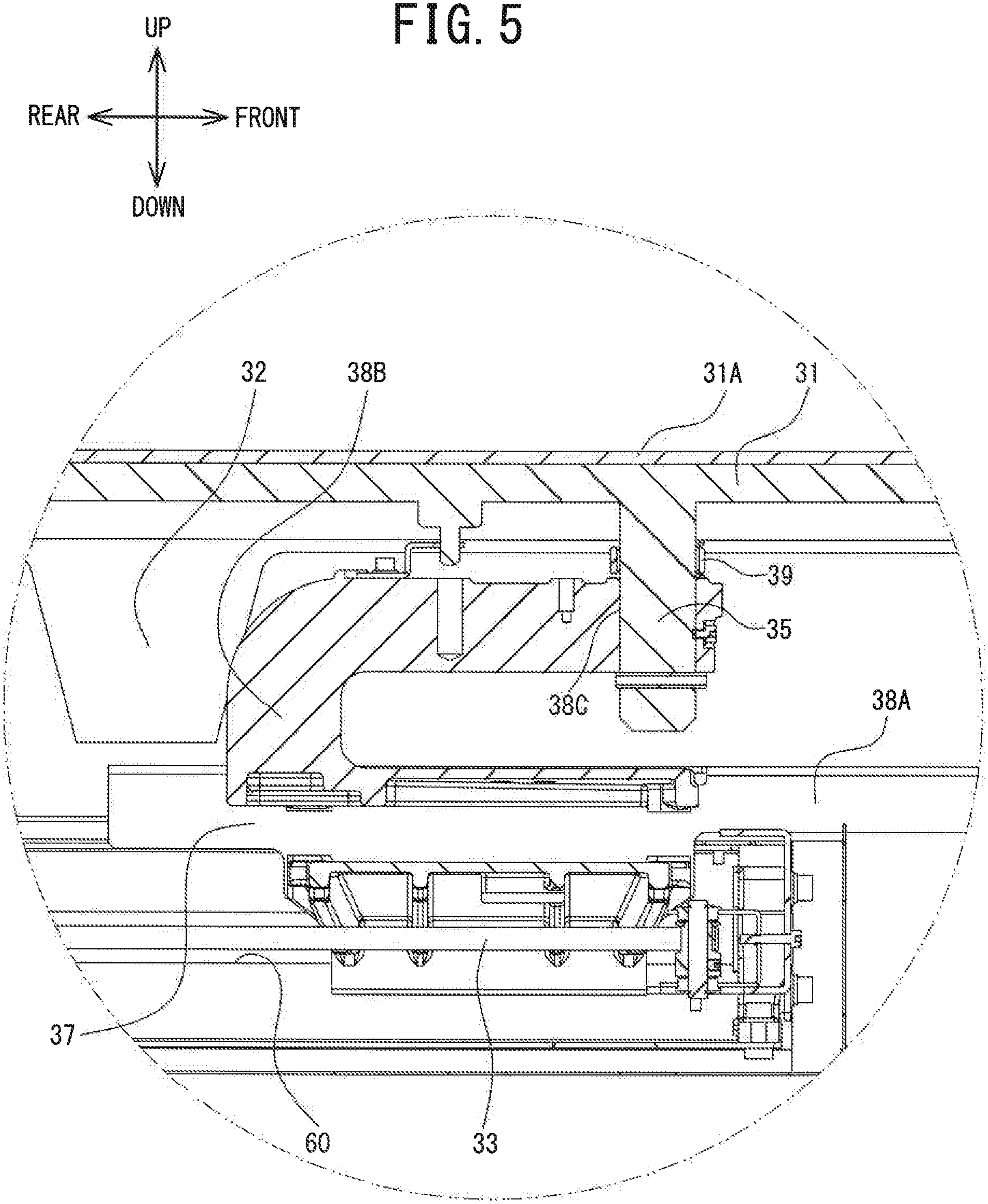
FIG. 5 is an enlarged view of a part surrounded by a circle of a double-dashed line shown in FIG. 4.
Figure 7:
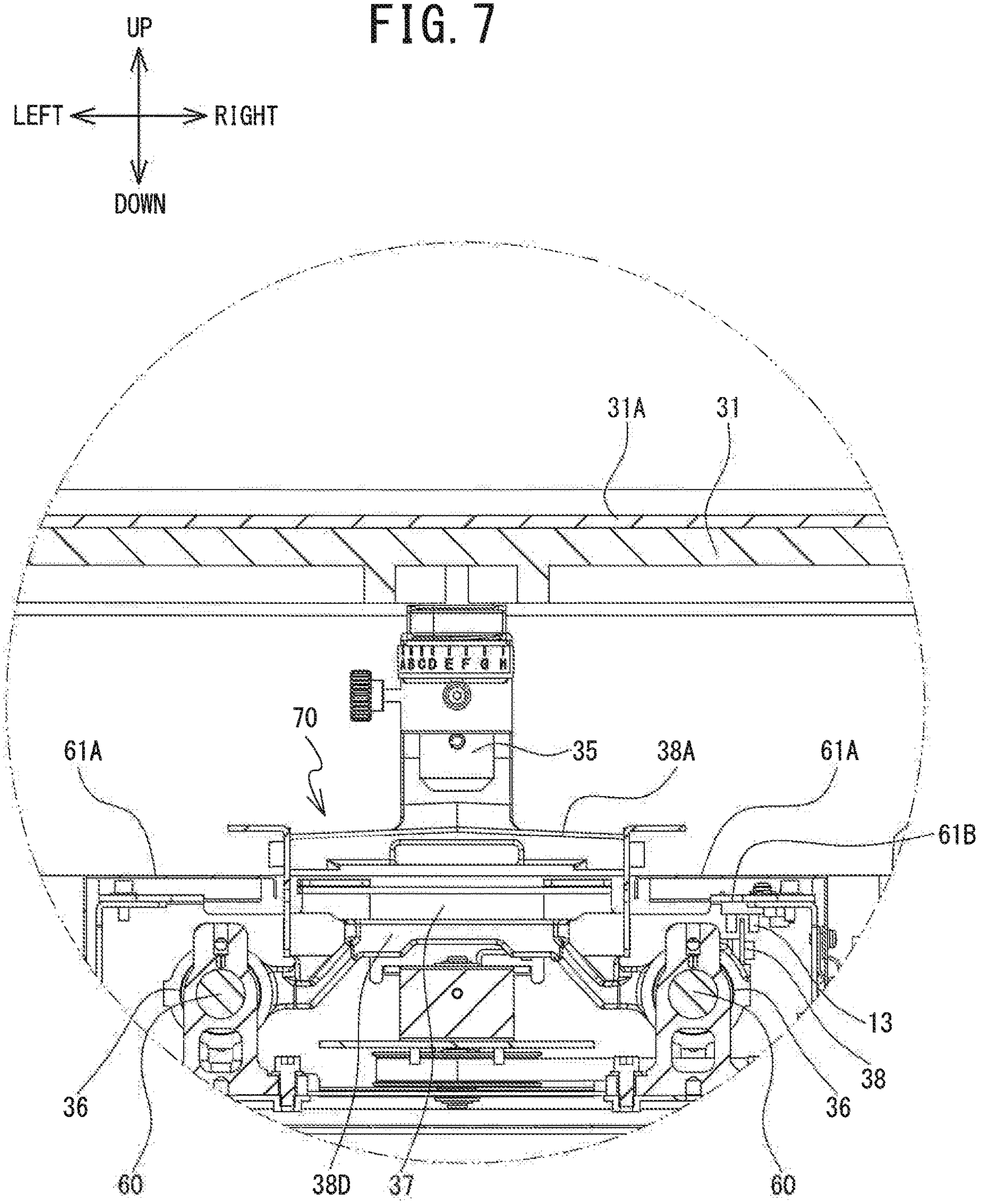
FIG. 7 is an enlarged view of a part surrounded by a circle of a double-dashed line shown in FIG. 6.

As shown in FIG. 5 and FIG. 7, the support portion 37 supports the platen 31. In addition to insertion holes 36, the support portion 37 is provided with a flap 38 that is provided extending upward from the vicinity of one of the insertion holes 36 of the support portion 37, a table 38A, a table support portion 38D, an arm portion 38B, and the like. More specifically, the table 38A is disposed between a first base 62 that will be described later and the platen 31, and is a plate-shaped member that is long in the first direction. The table support portion 38D supports the table 38A from below, a lower portion of the table support portion 38D is formed so as to bifurcate in the left-right direction, and the insertion holes 36 are formed in each of the end portions of the bifurcated lower portion. The arm portion 38B extends upward from the table 38A, curves toward the front, and extends in parallel to the lower surface of the platen 31. The leading end of the arm portion 38B has a cylindrical through hole 38C so as to penetrate the leading end of the arm portion 38B in the up-down direction. The coupling portion 35 of the platen 31 is coupled to the support portion 37 that is inserted through the through hole 38C. As shown in FIG. 7, the support portion 37 has the two insertion holes 36 through which the two guides 60 are inserted. The platen 31 is supported by the platen conveyance mechanism 70 by the coupling portion 35 being coupled to the support portion 37. Thus, the platen 31 moves in the front-rear direction in accordance with the movement of the support portion 37 in the front-rear direction by the belt 33 of the platen conveyance mechanism 70.

Figure 6:
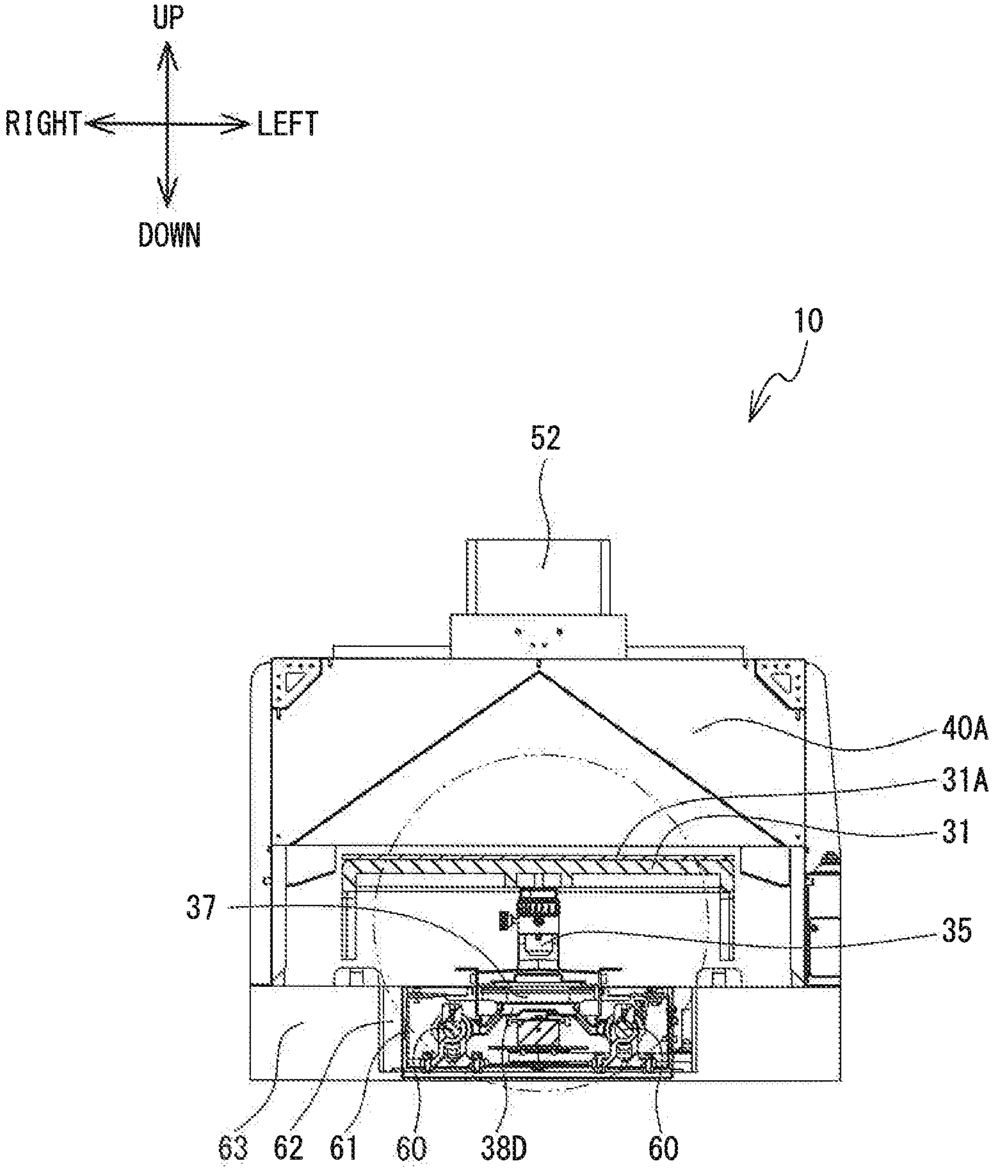
FIG. 6 is a cross-sectional view of the pretreatment device 10 along a line VI-VI shown in FIG. 1.

As shown in FIG. 6, the pretreatment device 10 is provided with the first base 62, which has a recessed portion 61 that is recessed in the first direction in a central portion in the left-right direction of the first base 62. The first base 62 is formed as a cuboid body that is long in the first direction. As shown in FIG. 6, the platen conveyance mechanism 70 that includes the two guides 60 is housed in the recessed portion 61 of the first base 62. As shown in FIG. 7, the left and right sides of the upper surface of the recessed portion 61 are covered by rectangular shaped top plates 61A that are long in the first direction. In other words, the central portion of the recessed portion in the left-right direction is open in the front-rear direction such that the platen conveyance mechanism 70 can move. Thus, since the left and right sides of the upper surface of the recessed portion 61 are covered by the top plates 61A, the pretreatment device 10 can reduce the risk of the pretreatment agent infiltrating into the recessed portion 61 housing the platen conveyance mechanism 70. The pretreatment device 10 is provided with a second base 63, which is formed in a cuboid shape that is long in the first direction, on the outside of the first base 62 in the left-right direction.

As shown in FIG. 5, in the platen 31, an urging member 39 that urges the platen 31 upward is provided on an upper portion of the coupling portion 35. The urging member 39 is an elastic member, and is a coil spring, for example. The upper end portion of the urging member 39 is in contact with the lower surface of the platen 31 and the lower end portion is in contact with the upper portion of the support portion 37, thus urging the platen 31 upward. It is sufficient that the urging member 39 have a shape into which the coupling portion 35 can be inserted, and, as an example, may be a cylindrical shape having a hole into which the coupling portion 35 is inserted. In other words, the platen 31 is urged upward by the urging member 39, but the platen 31 can be moved in the downward direction as the result of a downward pressing force. Further, when the downward pressing force is released, the platen 31 moves upward.

Configuration of Application Portion 40

As shown in FIG. 1, the application portion 40 is disposed so as to be separated from the set position P1 in the first direction. The application portion 40 is provided with a nozzle drive mechanism (not shown in the drawings), at least one spray 41 (refer to FIG. 4), a tank (not shown in the drawings) for the pretreatment agent, a flow path (not shown in the drawings) to supply the pretreatment agent inside the tank to the spray 41, and the like. The spray 41 starts spraying the pretreatment device 10 onto the cloth when a detection portion 24, which will be described below, detects the movement of the platen 31 to an application position P2 (refer to FIG. 4). The application position P2 is a position at which the application portion 40 starts application of the pretreatment agent. Nozzles (not shown in the drawings) of the spray 41 are respectively connected to the flow paths supplying the pretreatment agent inside the tank to the spray 41.

The spray 41 of the application portion 40 is surrounded by side surfaces to the left and the right, side surfaces to the front and the rear, and an upper surface of a second cover 40A that is provided extending vertically from the left end portion and the right end portion of the second base 63. The side surfaces to the left and the right are formed by plate-shaped members that are long in the up-down direction. The side surfaces to the front and the rear and the upper surface are formed by plate-shaped members that are long in the left-right direction. A surrounding structure provided with the left and right side surfaces, the front and rear side surfaces, and the upper surface that surround the application portion 40 is referred to as the "second cover 40A." The application portion 40 is provided in a central portion of the upper surface of the second cover 40A. When the cloth and the porous member 31A are placed on the platen 31, the position in the up-down direction of the front and rear side surfaces is set to be a location at which the cloth can pass below the lower edges of the front and rear side surfaces.

Figure 11:
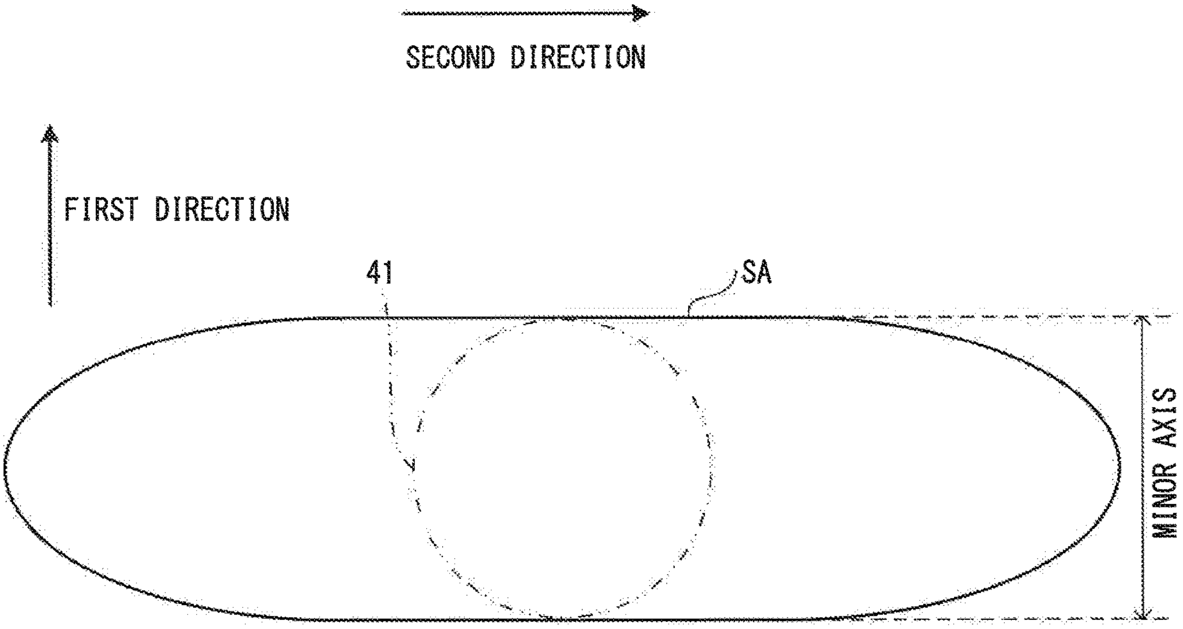
FIG. 11 is a diagram showing a shape of an application region of a single spray.
Figure 14:
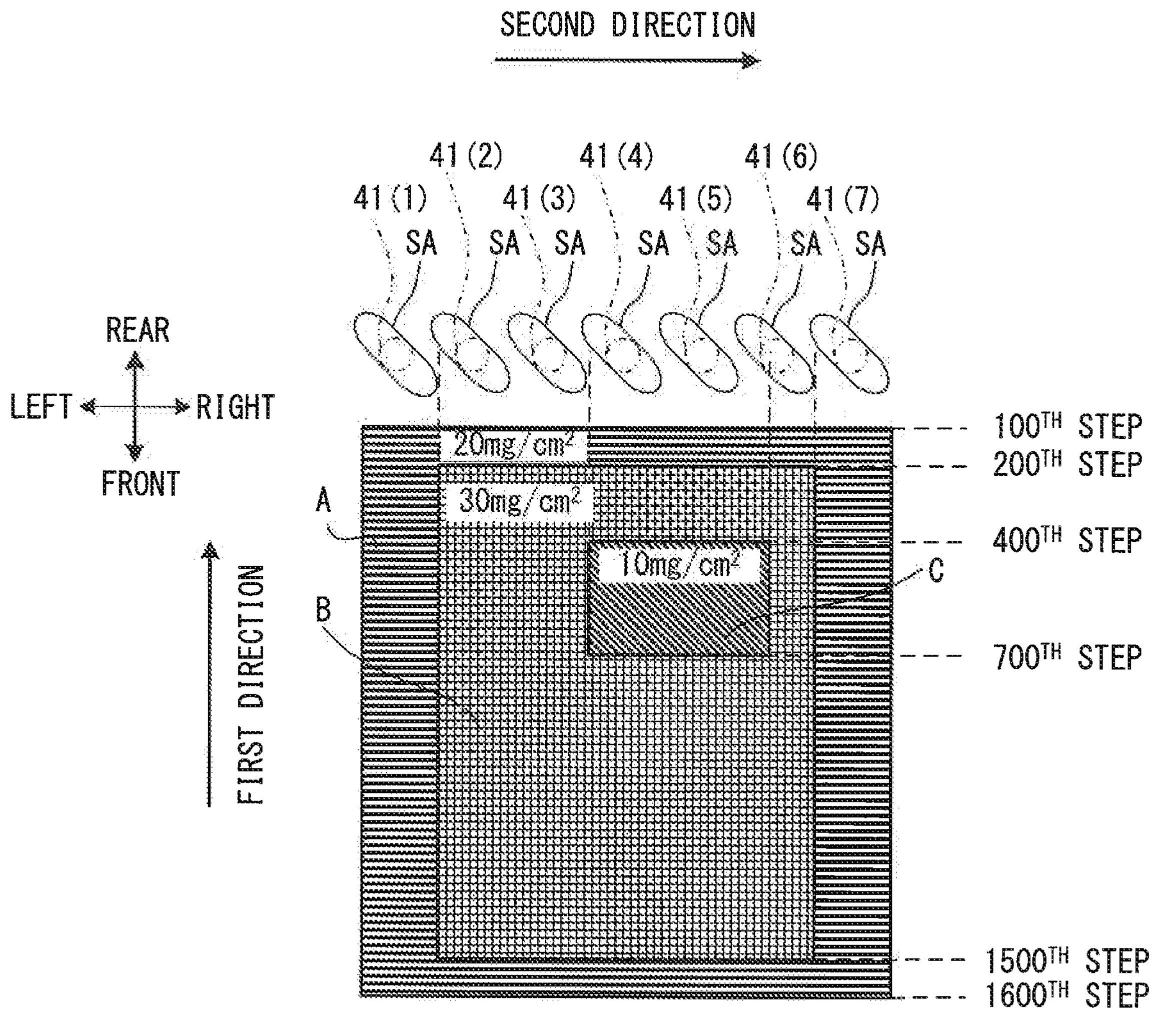
FIG. 14 is a diagram showing an application range of a specific example.
Figure 17:
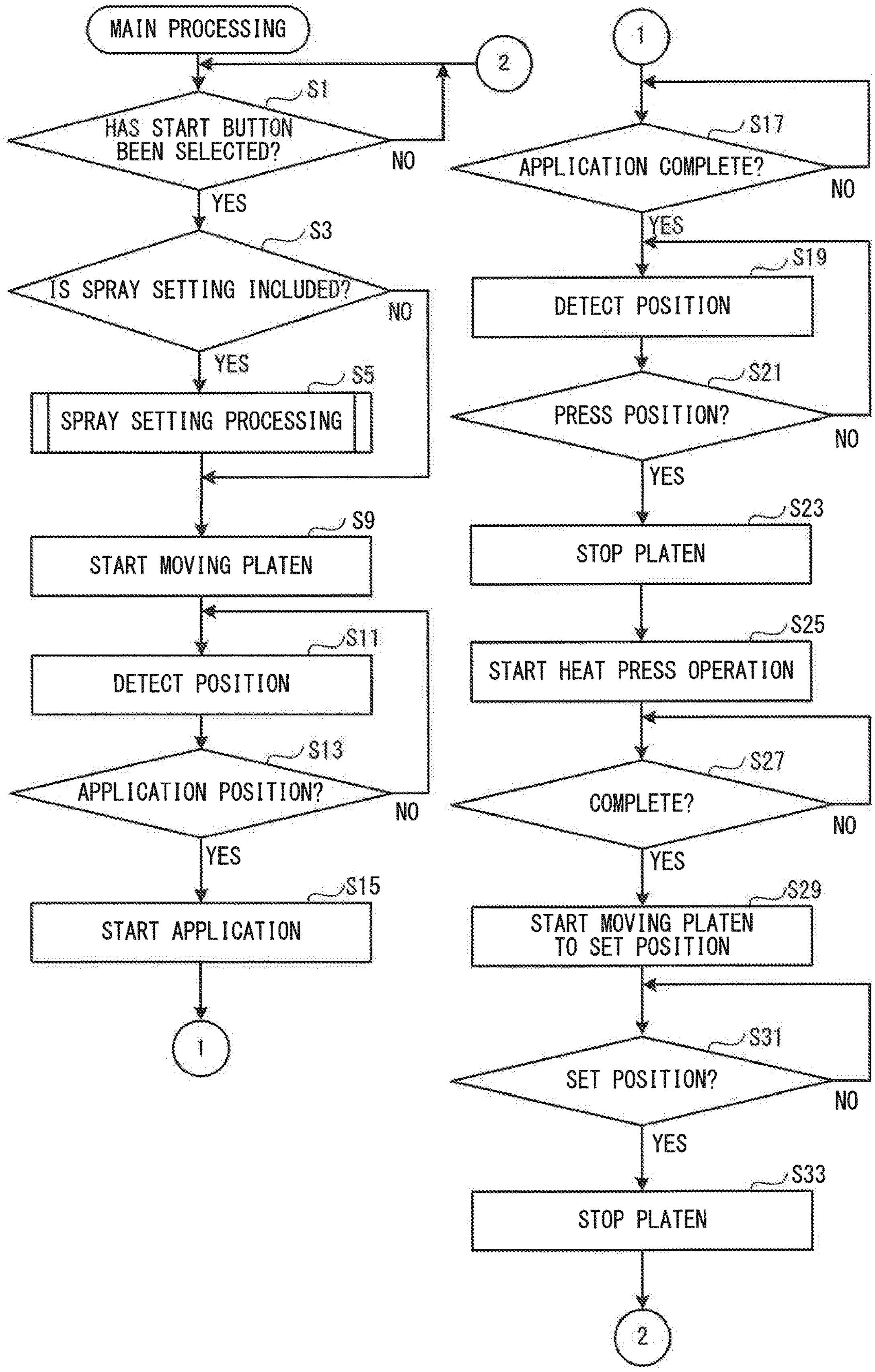
FIG. 17 is a flowchart of main processing.

Further, in some cases, the application portion 40 is provided with a plurality of the sprays 41. The operator specifies the spray 41 to be stopped via an operation portion 20 or a communication portion 23, which will be described below. In this case, the specified spray 41 stops the application of the pretreatment agent. The plurality of sprays 41 are arranged side by side in the left-right direction, and by causing application regions SA of each of the sprays 41 to be connected with each other in the left and right direction, the pretreatment agent can be applied to the entire top surface of the platen 31. For example, as shown in FIG. 11, the shape of the application region SA of the pretreatment agent of each spray 41 is an oval shape whose minor axis is parallel to the first direction. As shown in FIG. 14, the plurality of sprays 41 may be arranged side by side in the lateral direction, and the minor axis direction of each application region SA may intersect the first direction. Also in this case, by connecting the respective application regions SA in the right and left direction, it is possible to apply the entire upper surface of the platen 31 with the pretreatment agent. Accordingly, although the application amount of the end portion of the oval application region SA in the first direction is reduced, since the end portion thereof overlaps the end portion of the adjacent application region SA in the first direction, the total coating amount is uniform.

Configuration of Heat Press Portion 50

As described above, the heat press portion 50 is disposed so as to be separated from the application portion 40 in the first direction. As shown in FIG. 1, the heat press portion 50 is provided with a press surface 51, a press surface drive mechanism 52, a coupling portion 53, a press support portion 54, and the like. The press surface drive mechanism 52 is provided with a pulley (not shown in the drawings), a press motor 19, and the like. As shown in FIG. 1, the press surface 51 is formed in a substantially rectangular shape that is long in the first direction. Further, an end portion 51A of the press surface 51 is preferably formed as a curved surface or as a tapered portion having a tapered shape that is inclined upward. The press surface 51 is internally provided with a heat generation mechanism (not shown in the drawings) that generates heat to a specified temperature, and can be moved up and down by the press surface drive mechanism 52. When the detection portion 24 detects the movement of the platen 31 to a press position P3 (refer to FIG. 8), the press surface 51 is lowered by the press surface drive mechanism 52, and the press surface 51 starts the heat press operation on the cloth. When the detection portion 24 detects the movement of the platen 31 to the press position P3, the operation by which the press surface drive mechanism 52 lowers the press surface 51, and the press surface 51 starts to heat press the cloth is referred to as an "operation mode." In the "operation mode," for example, the press surface 51 is lowered by the press surface drive mechanism 52 only when the detection portion 24 detects the movement of the platen 31 to the press position P3. The press position P3 is a position at which the heat press portion 50 starts the press operation. The direction in which the press surface 51 is lowered is a press direction. The press surface 51 is larger in all directions (the front-rear direction) than the press surface 51. Therefore, when the platen 31 is positioned at the press position P3, the pretreatment device 10 can heat press a region of the cloth, to which the pretreatment agent has been applied, in one operation A position of the lower surface of the press surface 51 at a standby position at the time when the heat press is not performed is set so as to be higher than a position of the upper surface of the cloth when the porous member 31A and the cloth are placed on the upper surface of the platen 31. The coupling portion 53 extends perpendicularly and downwardly from a central portion of the lower surface of the press surface drive mechanism 52 toward the upper surface of the press surface 51, and couples the press surface 51 with the press surface drive mechanism 52.

As shown in FIG. 1, the press support portion 54 is vertically provided from both the left end portion and the right end portion of the second base 63, and has a shape formed as a result of plate-shaped side surfaces parallel to the first direction and a plate-shaped upper surface parallel to the upper surface of the platen 31 being coupled together. Front and rear end portions of the press support portion 54 are provided with flanges 54A that respectively extend vertically and outwardly with respect to the both side surfaces and the upper surface of the press support portion 54. By providing the flanges 54A, the pretreatment device 10 can improve the strength of the press support portion 54. The press support portion 54 includes a substantially square-shaped through-hole 54B in a central section of the upper surface of the press support portion 54. The shape of the through-hole 54B is substantially the same as the cross-sectional shape of the coupling portion 53 when the coupling portion 53 is cut in a direction parallel to the upper surface of the platen 31. As shown in FIG. 4, the size of the through-hole 54B is smaller than the size of the lower surface of the press surface drive mechanism 52, and is a size that allows the coupling portion 53 to be inserted through the through-hole 54B. Thus, by inserting the coupling portion 53 into the through-hole 54B and coupling the press surface 51 with the coupling portion 53, the press support portion 54 supports the press surface 51.

Mechanism to Allow Press Pressure to Escape

Figure 8:
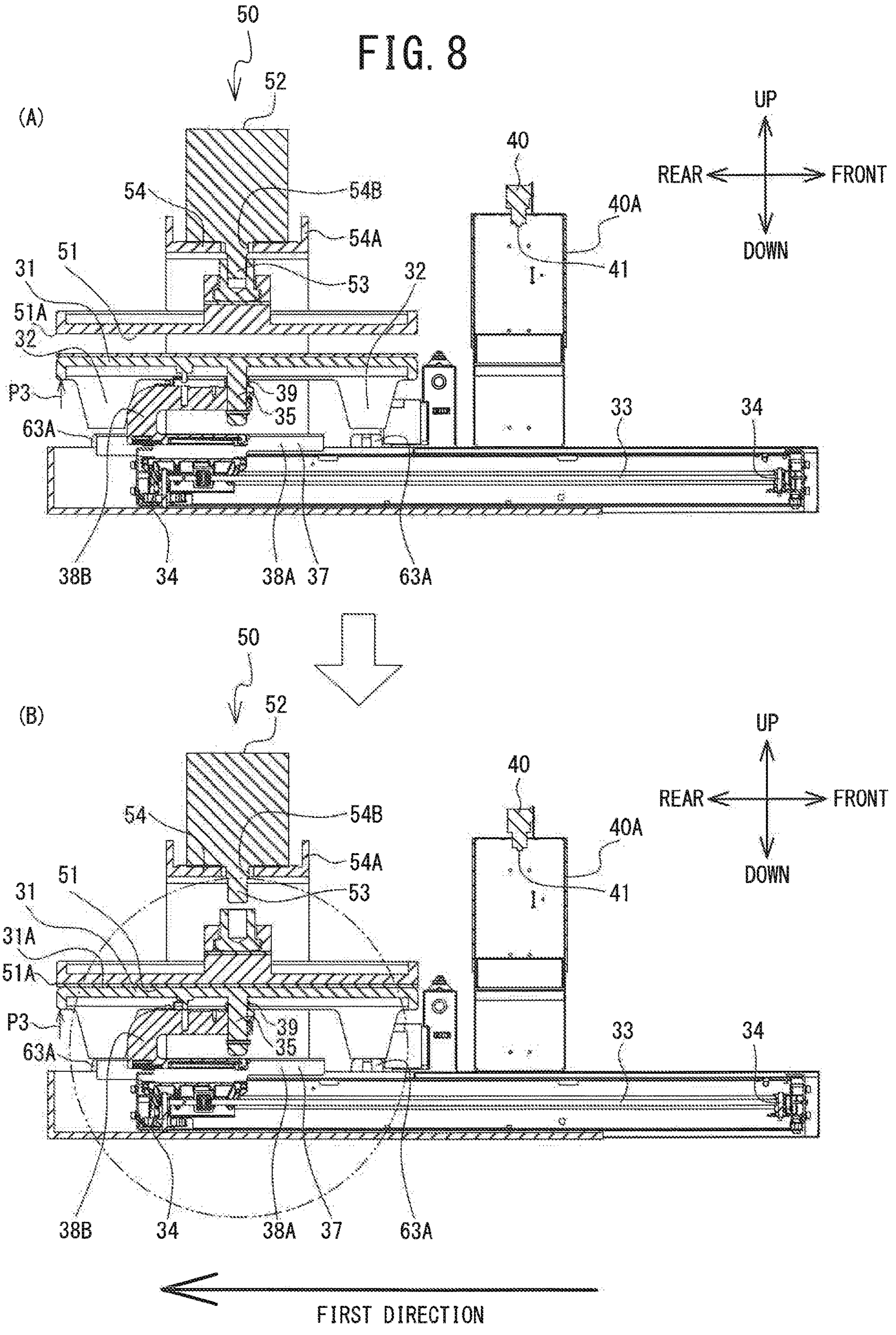
FIG. 8 is a cross-sectional view of the pretreatment device 10 along the line IV-IV shown in FIG. 1 immediately before a heat press operation and at a time of the heat press operation.
Figure 9:
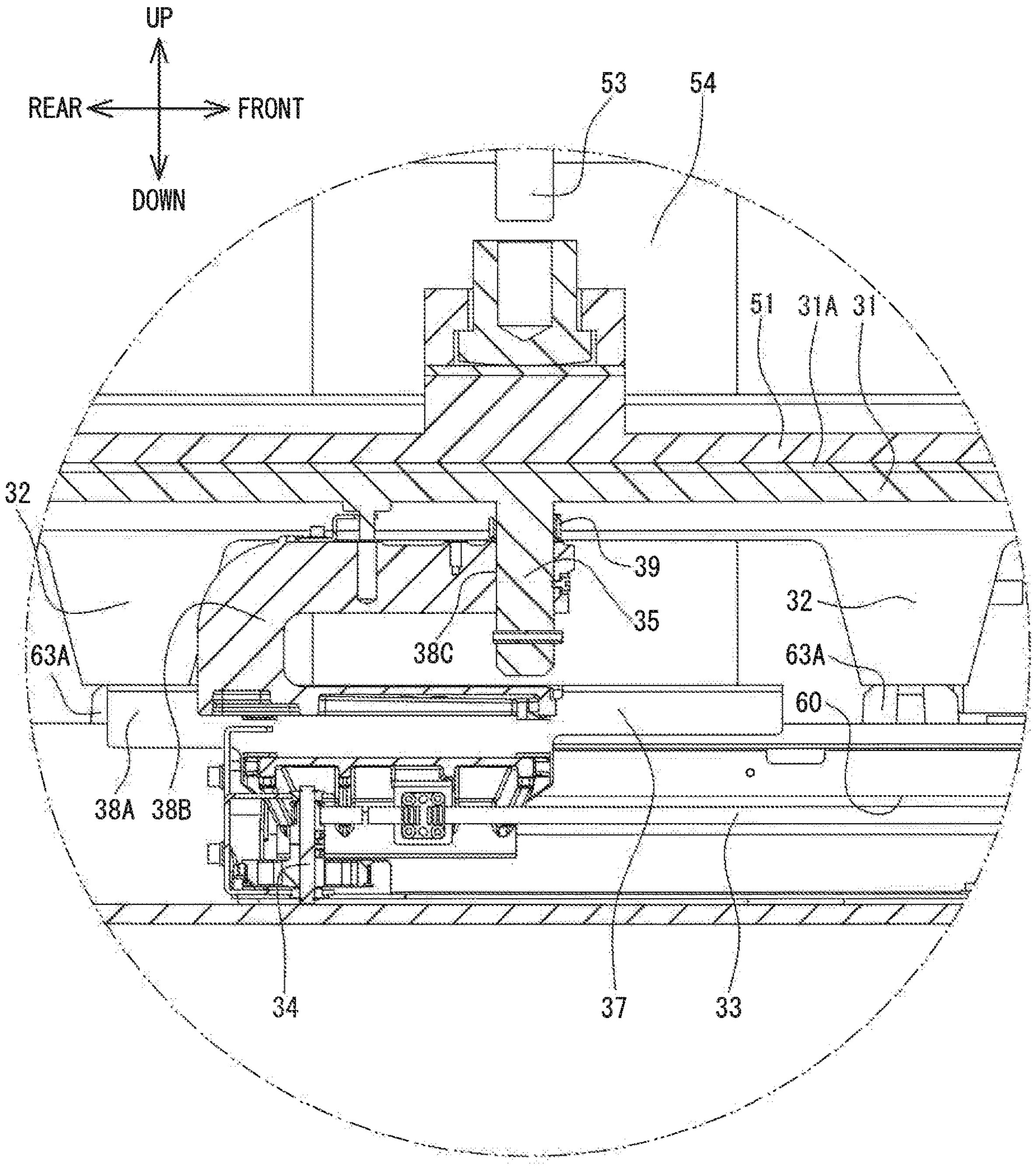
FIG. 9 is an enlarged view of a part surrounded by a circle of a double-dashed line shown in FIG. 8.

A mechanism to allow press pressure to escape will be explained with reference to FIG. 8 and FIG. 9. In FIG. 8, FIG. 8A shows a state immediately before the heat press operation after the platen 31 has arrived at the press position P3, and FIG. 8B shows a state at a time of the heat press operation. FIG. 9 is an enlarged view of a part surrounded by a circle of a double-dashed line in FIG. 8. As described above, the platen 31 is provided with four of the leg portions 32 on the lower surface thereof. Further, the second base 63 on the left and the right side is provided with four contact portions 63A at positions, of the upper surface of the second base 63, which face positions of the leg portions 32 at the time of the heat press operation. A total length of the height of the contact portion 63A and the length of the leg portion 32 in the up-down direction is set in advance such that the total length does not exceed a movement limit of the platen 31 in the downward direction when each of the leg portions 32 comes into contact with each of the contact portions 63A at the time of the heat press operation. Movement limits are an upper limit and a lower limit of the movable range of the platen 31 in the up-down direction. More specifically, as shown in FIG. 8B, at the time of the heat press operation, the platen 31 is moved in the downward direction within a range that does not exceed the movement limit, and is supported by each of the leg portions 32 and each of the contact portions 63A. Further, as shown in FIG. 9, a lower end of the coupling portion 35 of the platen 31 is set in advance so as not to be able to come into contact with the support portion 37 coupled with the guides 60, when the leg portions 32 respectively face and come into contact with the contact portions 63A at the time of the heat press operation. Thus, press pressure is allowed to escape from each of the leg portions 32 to each of the contact portions 63A. As a result, the press pressure applied to the guides 60 can be reduced. Therefore, compared with the pretreatment device 10 that does not include the contact portions 63A and the leg portions 32, as there is no need to increase the rigidity of the guides 60, the pretreatment device 10 of the present embodiment can achieve both cost reductions or downsizing.

Electrical Configuration of Pretreatment Device 10

Figure 10:
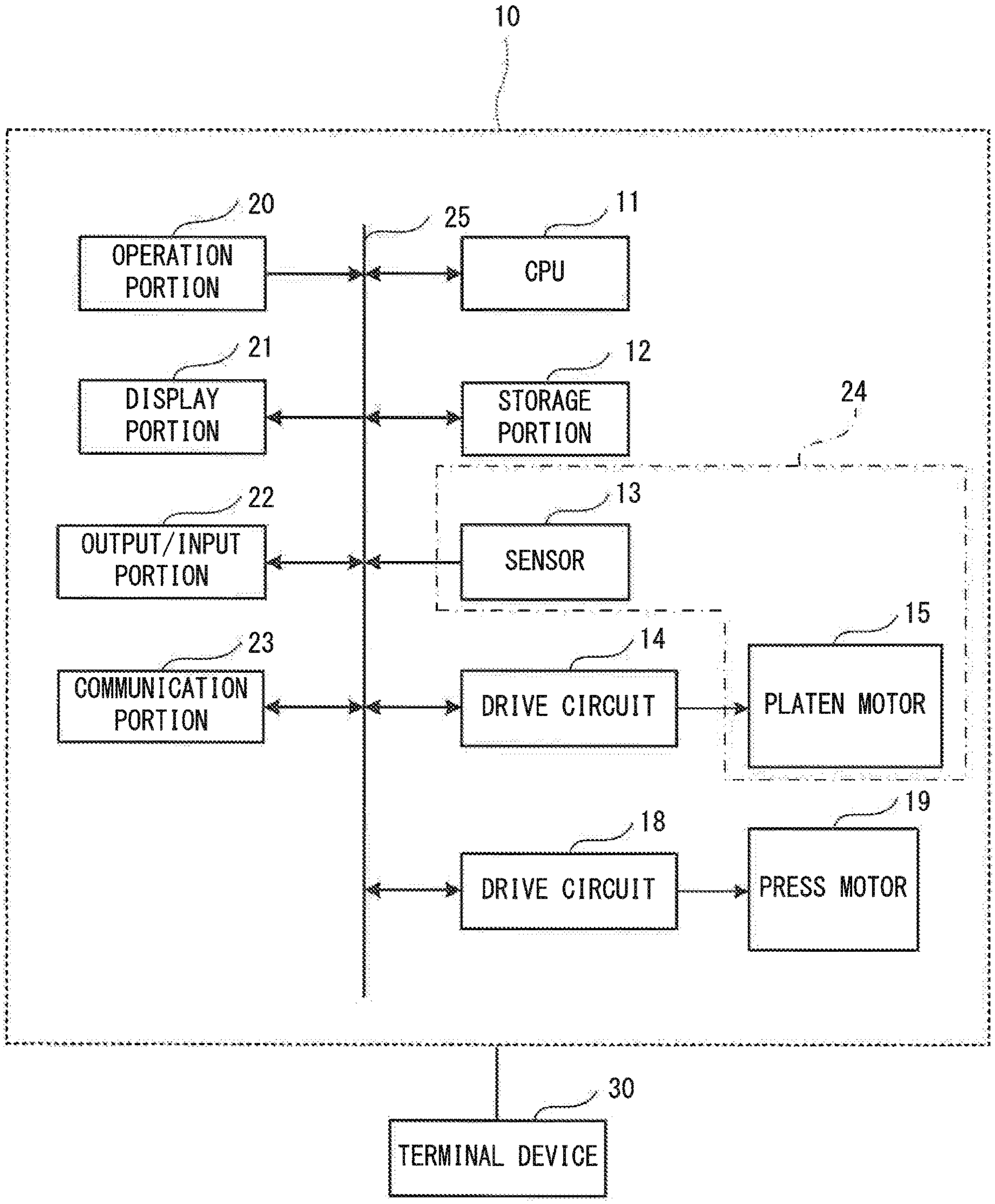
FIG. 10 is a block diagram schematically showing an electrical configuration of the pretreatment device 10.

As shown in FIG. 10, the pretreatment device 10 is provided with the CPU 11, a storage portion 12, a sensor 13, drive circuits 14, 16, and 18, the operation portion 20, a display portion 21, an output/input portion 22, a communication portion 23, and the like, and they are connected with to other via a bus 25. The CPU 11 controls the pretreatment device 10, reads various types of programs from the storage portion 12, and performs various types of operations. For example, the CPU 11 reads a program for main processing from the storage portion 12, and performs the main processing, which will be described in detail below. Further, the CPU 11 functions as a setting portion, a conveyance speed control portion, and a spray control portion, each of which will be described below in detail. The storage portion 12 is provided with a ROM, a RAM, a non-volatile flash memory, and the like. The storage portion 12 stores various types of programs, parameters, and the like. Further, the storage portion 12 stores a first table T1, a second table T2, and operation flags, all of which will be described in detail below. Further, the storage portion 12 stores information associating a number of steps of the platen motor 15 with the application position P2 and the press position P3. Further, the storage portion 12 stores a correlation relationship between the distance between the spraying surface of the spray 41 and the application surface of the cloth, and the spraying amount of the pretreatment agent from the spray 41, such that an application amount of the pretreatment agent per unit area is substantially the same even when the position of the spray 41 changes in the up-down direction. Further, as shown in FIG. 15A and FIG. 15B, a position with of the X coordinate of the platen 31 at which the application of the pretreatment agent is started is associated with the number of steps of the platen motor 15 and stored in the storage portion 12. A X axis of the platen 31 is parallel to the front-rear direction, and a Y axis of the platen 31 is parallel to the left-right direction. An origin point of the XY coordinates is a front left end of the platen 31. A positive direction of the X axis is the first direction, and a positive direction of the Y axis is the left to right direction. Further, it is preferable that the storage portion 12 stores a default value of an application amount per unit area.

The sensor 13 is a position detection sensor, such as a transmission sensor, and is disposed at a position at which the set position P1 of the platen 31 can be detected. As long as the sensor 13 can detect the set position P1, a position detection sensor of one of a mechanical type and an optical type can be used. For example, as shown in FIG. 7, the sensor 13 is disposed in the vicinity of one of the guides 60 and on the lower surface of the top plate 61A. Further, the sensor 13 is disposed a position at which the flap 38 is detected by the sensor 13 is disposed to be the position of the set position P1. A first cover 61B is provided so as to cover at least an upper portion of the sensor 13, on the lower surface of the top plate 61A on which the sensor 13 is disposed. The drive circuit 14 is connected to the platen motor 15, and drives the platen motor 15 in accordance with control of the CPU 11. The drive circuit 18 is connected to the press motor 19 and drives the press motor 19 in accordance with the control of the CPU 11. In the present embodiment, the detection portion 24 is configured by the combination of the sensor 13 and the platen motor 15. As described above, in the present embodiment, the platen motor 15 is the stepping motor. Thus, since the number of steps of the platen motor 15 is associated with the application position P2 and the press position P3, respectively, and stored, the detection portion 24 can detect the application position P2 and the press position P3 on the basis of the number of steps from the set position P1. Further, since each of the X coordinates of the platen 31, and the number of steps for the start of the application and the end of the application associated with each of the X coordinates are stored in the storage portion 12, when the operator specifies coordinates identifying the application range via the operation portion 20 or the communication portion 23, the detection portion 24 can detect the application position P2 corresponding to the application range. In addition, the detection portion 24 can detect the end of application position of the application range.

The operation portion 20 is provided with an operation panel and the like. For example, the operation panel is provided with buttons or the like. Thus, the operator can give a desired instruction to the pretreatment device 10 via the operation portion 20. The display portion 21 is configured by a display device or the like, such as a CRT, a liquid crystal monitor, an organic EL, or the like. The display portion 21 is provided with a touch panel, and also functions as the operation portion 20. The output/input portion 22 is provided with a SD memory card slot, a USB port, and the like.

The communication portion 23 includes at least one of a wireless module or a wired module, and can be connected to a terminal device 30 via a network such as the Internet or an intranet. The pretreatment device 10 need not necessarily include the communication portion 23, and may be connected to the terminal device 30 via the network using the wireless module that can be connected to the USB port. The pretreatment device 10 may be provided with a serial interface of another standard instead of the USB port, and may be connected to an external device, such as the terminal device 30, via a serial cable of the other standard. For example, the terminal device 30 is a PC, a tablet, a smartphone, or the like. The operator can also give a desired instruction to the pretreatment device 10 via the terminal device 30 connected to the pretreatment device 10. In the description below, the instruction of the operator is input to the CPU 11 via the operation portion 20 or the communication portion 23. For example, the instruction of the operator includes the coordinates identifying the application range of the pretreatment agent, and the application amount per unit area of the pretreatment agent.

First Table T1

As shown in FIG. 12, a first table T1 is a table in which each of the sprays 41 is associated with an application section of the application region SA in the left-right direction (the Y axis direction). The first table T1 is an example of a case in which the number of the sprays 41 is seven, and the left end of the platen 31 is "0" on the Y axis. For example, the application section of the spray 41 (3) is [b, c]. The application section is a section on the y-axis. Thus, the spray 41 (3) can spray the pretreatment agent onto the application section [b, c]. When the instruction of the operator includes the coordinates identifying the application range of the pretreatment agent and the application amount per unit area of the pretreatment agent, the CPU 11 (the spray control portion) refers to the first table T1 and causes the spray 41 that sprays the pretreatment agent outside the specified application range to be stopped.

Second Table T2

As shown in FIG. 13, a second table T2 is a table in which a combination of the conveyance speed of the platen 31 and a spray duty ratio are each associated with the application amount per unit area (hereinafter referred to as a "application amount"). The spray duty ratio is the proportion of the spray period in the spray cycle. The number in the frame of the thick line of the second table T2 indicates the application amount ($mg/cm^2$). The number on the uppermost row outside the frame of the thick line shows the spray duty ratio (%). The numeral at the left end outside the frame of the thick line indicates the stage of the conveyance speed of the platen. "1" is the slowest, "10" is the fastest. Hereinafter, a case where an instruction of the operator includes an instruction to set the application amount per unit area to 20 $mg/cm^2$ will be described. "20" is present four times in the second table T2. One "20" is hatched using diagonal lines, another "20" is hatched using horizontal lines, another "20" is hatched using horizontal lines, another "20" is surrounded by a circle, the last "20" is hatched using vertical lines. Note that, each hatching and circle is merely described for the sake of explanation and is not included in the data of the second table T 2. The slower the conveyance speed of the platen 31, the worse the productivity. On the other hand, the faster the conveyance speed of the platen 31, the more likely it is that a displacement of the application region SA becomes larger. In general, the slower the conveyance speed of the platen 31, the better the image quality, since the pretreatment agent tends to be applied more evenly. Thus, the CPU 11 (a selection portion) sets the best combination in terms of a balance between the productivity and the risk of causing the displacement of the application region SA. A diagonal dotted line L1 shown in FIG. 13 indicates the combination of the best balance. Note that, the diagonal dotted line L1 is merely described for the sake of explanation and is not included in the data of the second table T2. More specifically, the CPU 11 (the selection portion) sets the combination of the conveyance speed of the platen 31 and the spray duty ratio corresponding to the application amount the "20" just above or closest to the dotted line L1 shown in FIG. 13. For example, of the above-described four "20," the "20" hatched using the diagonal lines is a low-speed conveyance and an intermittent spray, and corresponds to a high-quality mode. The "20" hatched using the horizontal lines is a high-speed conveyance and a continuous spray, and corresponds to a high-production mode. The "20" hatched using the vertical lines corresponds to a balanced mode in which the conveyance speed and the spray duty ratio are respectively set at intermediate values between the high-quality mode and the high-production mode. The "20" surrounded by the circle also corresponds to the balance mode, but the image quality is higher in the "20" hatched with vertical lines. Setting the most balanced combination in terms of the productivity and the risk of the displacement of the application region SA means setting the balanced mode, in a situation when three or more modes, such as the high-quality mode, the high-production mode, and the balanced mode, can be set. Further, when there are a plurality of balance modes, the CPU 11 (the selection portion) may select image quality with priority. In addition, the CPU 11 (the selection portion) may select productivity in preference. These selections may be made in advance as to which one of image quality or productivity is prioritized.

Then, the CPU 11 (the speed control portion) refers to the correlation information, which is stored in the storage portion 12, between the position at which the application of the pretreatment agent is started, and the number of steps of the platen motor 15 in relation to the X coordinate of the platen 31, and controls the conveyance speed of the platen 31 to be a conveyance speed of the platen 31 specified by the set combination during a time period from the start of application to the end of application. Further, the CPU 11 (the spray control portion) controls the spray duty ratio to be the spray duty ratio set on the basis of the second table T2 during the time period from the start of application to the end of application. The spray duty ratio is a ratio of a spray time during a spray time period.

Specific Examples

FIG. 14 shows application ranges A, B, C of three specific examples and the arrangement of the spray 41 (1) to (7). In the application range A, all the sprays 41 (1) to (7) spray the pretreatment agent at the application amount of 20 mg/cm$^2$ per unit area, from the 100$^{th}$ step to the 1600$^{th}$ step corresponding to the number of steps of the platen motor 15. In the application range B, the sprays 41 (2) to (6) spray the pretreatment agent at the application amount of 30 mg/cm$^2$ per unit area, from the 200$^{th}$ step to the 1500$^{th}$ step corresponding to the number of steps of the platen motor 15. In the application range C, the sprays 41 (4) to (6) spray the pretreatment agent at the application amount of 10 mg/cm$^2$ per unit area, from the 400$^{th}$ step to the 700$^{th}$ step corresponding to the number of steps of the platen motor 15. In a case of the application range C, as shown in FIG. 14, the left-right direction application section of the spray 41 (6) includes a region other than the application range C. In this case, when the Y coordinate of the coordinates identifying the application range, which are included in the instruction of the operator, is a point other than an end point of the application section of each of the sprays 41, which are shown in FIG. 12, the CPU 11 (the spray control portion) causes the spray 41 that includes the specified Y coordinate inside the application section to spray the pretreatment agent.

FIG. 15A, FIG. 15B, and FIG. 16 show examples of parameters set by the CPU 11 (the conveyance speed control portion) and the CPU 11 (the spray control portion), when the instruction of the operator includes the coordinates identifying the application range and the application amount per unit area of the pretreatment agent. An example of the parameter is the spray duty ratio of the spray 41 and the conveyance speed of the platen 31. FIG. 15A shows the parameters applied when the pretreatment agent is applied to the application range A at 20 mg/cm$^2$ per unit area. Referring to the second table T 2 shown in FIG. 13, the CPU 11 (setting portion) sets the combination of the conveyance speed "6" of the platen 31 and the spray duty ratio "40" corresponding to the "20" closest to the dotted line L1. Thus, over a step range of the platen motor 15 from the 100$^{th}$ step to the 1600$^{th}$ step, the CPU 11 (the conveyance speed control portion) controls the conveyance speed of the platen 31 to be "6." Further the CPU 11 (the spray control portion) controls the spray duty ratio of each of the sprays 41 (1) to (7) to be "40." Note that, when the pretreatment agent is applied to a maximum range of the cloth over which the pretreatment agent can be applied, there is no need to input the coordinates identifying the application range. In other words, when the coordinates identifying the application range are not input, the CPU 11 (the spray control portion) causes the pretreatment agent to be applied to the maximum range over which the pretreatment agent can be applied.

FIG. 15B shows the parameters applied when the pretreatment agent is applied to the application range B at 30 mg/cm$^2$ per unit area. As an example, as shown in FIG. 13, the CPU (the setting portion) sets the combination of the conveyance speed "5" of the platen 31 and the spray duty ratio "50", closest to the dotted line L1. Thus, over the step range of the platen motor 15 from the 100$^{th}$ step to the 1600$^{th}$ step, the CPU 11 (the conveyance speed control portion) controls the conveyance speed of the platen 31 to be "5." Further, over the step range of the platen motor 15 from the 200$^{th}$ step to the 1500$^{th}$ step, the CPU 11 (the spray control portion) controls the spray duty ratio of each of the sprays 41 (2) to (6) to be "50." From the 100$^{th}$ step to the 200$^{th}$ step, and from the 1500$^{th}$ step to the 1600$^{th}$ step, the CPU 11 (the spray control portion) stops the spraying from the sprays 41 (2) to (6), and from the 100$^{th}$ step to 1600$^{th}$ step, stops the spraying from the sprays 41 (1) and (7). Note that, as shown in FIG. 13, there is another one having the application amount per unit area of 30 mg/cm$^2$ closest to the dotted line L1. The another one is the "30" hatched with vertical lines. The distance from the "30" hatched with a vertical line to the dotted line L1 is the same as the distance to the dotted line L1 from the "30" hatched with diagonal lines (a combination of the conveyance speed "5" of the platen 31 and the spray duty ratio "50"). The CPU 11 (setting portion) can also set a combination of the conveyance speed "6" of the platen 31 and the spray duty ratio "60" corresponding to the "30" hatched with the vertical line. In this way, when a plurality of the combinations can be set, the CPU 11 (the setting portion) randomly sets one of the combinations. The decision as to which of these is to be set may be based on the fact that it is decided in advance which of image quality or productivity is prioritized. Note that, when the coordinates identifying the application range have been input, the CPU 11 (the conveyance speed control portion) may use a different conveyance speed of the platen 31 at front and rear of the application range, from the conveyance speed applied during the application of the pretreatment agent. For example, the CPU 11 (the conveyance speed control portion) may control the conveyance speed to be a conveyance speed applied when the platen 31 is moved from the set position P1 to the application portion 40, or to be the maximum conveyance speed of the platen 31, such as the platen conveyance speed "10," for example.

FIG. 16 shows the parameters applied when the pretreatment agent is applied to the application range C at 10 mg/cm$^2$ per unit area. As an example, as shown in FIG. 13, the CPU (the setting portion) sets the combination corresponding to the "10" hatched with diagonal lines closest to the dotted line L1, namely, the combination in which the conveyance speed of the platen 31 is "6" and the spray duty ratio is "20." Thus, over the step range of the platen motor 15 from the 100$^{th}$ step to the 1600$^{th}$ step, the CPU 11 (the conveyance speed control portion) controls the conveyance speed of the platen 31 to be "6." Further, over the step range of the platen motor 15 from the 400$^{th}$ step to the 700$^{th}$ step, the CPU 11 (the spray control portion) controls the spray duty ratio of each of the sprays 41 (4) to (6) to be "20." From the 100$^{th}$ step to the 400$^{th}$ step, and from the 700$^{th}$ step to the 1600$^{th}$ step, the CPU 11 (the spray control portion) stops the spraying from the sprays 41 (4) to (6), and from the 100$^{th}$ step to 1600$^{th}$ step, stops the spraying from the sprays 41 (1) to (3), and (7). Note that, in the second table T 2 shown in FIG. 13, there is another one having the application amount per unit area of 10 mg/cm$^2$ closest to the dotted line L1. The another one is the "10" hatched with vertical lines. The distance from the "10" hatched with the vertical line to the dotted line L1 is the same as the distance from the "10" hatched with hatching to the dotted line L1. The CPU 11 (the setting portion) can also set a combination of the conveyance speed "9" and the spray duty ratio "50" of the platen 31 corresponding to "10" hatched with the vertical line.

Main Processing

The main processing will be explained with reference to FIG. 13. The CPU 11 reads the program for the main processing, and performs the main processing. The main processing is started when triggered by turning on a power source, for example.

The CPU 11 determines whether the instruction of the operator includes a selection of a start button (step S1). When it is determined that the selection of the start button is not included (no at step S1), the CPU 11 repeats the processing at step S1, and waits for the selection of the start button. When it is determined that the selection of the start button is included (yes at step S1), the CPU 11 determines whether the instruction of the operator includes a setting of the sprays 41 (step S3). More specifically, the CPU 11 determines whether the instruction of the operator includes at least one of settings relating to a position of the sprays 41 or the stopping of some of the sprays 41, for example.

When it is determined that the setting of the sprays 41 is not included (no at step S3), the CPU 11 advances the processing to step S9. When it is determined that the setting of the sprays 41 is included (yes at step 3), the CPU 11 performs spray setting processing (step S5), which will be described later. Next, the CPU 11 starts the movement of the platen 31 (step S9). Next, the detection portion 24 detects the position of the platen 31 (step S11).

The CPU 11 determines whether the position of the platen 31 detected on the basis of the signal from the detection portion 24 is the application position P2 (step S13). More specifically, the CPU 11 compares the number of steps of the platen motor 15 with the number of steps of the application position P2 corresponding to the X coordinate of the front end of the specified application range, and the CPU 11 determines it. When it is determined that the position of the platen 31 is not the application position P2 (no at step 13), the CPU 11 returns to the processing at step S11 and repeats the above-described processing. When it is determined that the position of the platen 31 is the application position P2 (yes at step 13), the CPU 11 (a spray control portion) controls the application portion 40 and starts applying the pretreatment agent onto the cloth (step S15). In this case, when the instruction of the operator includes the coordinates identifying the application range and the application amount per unit area of the pretreatment agent, the CPU 11 (the spray control portion) controls the spray 41 for spraying the pretreatment agent so that the pretreatment agent can be applied on the basis of the spray duty ratio set in the spray setting processing (step S5). At the same time, the CPU 11 (the conveyance speed control portion) controls the conveyance speed of the platen 31, on which the pretreatment agent is applying, so as to be the conveyance speed of the platen 31 set in the spray setting processing (S5). Further, when the instruction of the operator includes the coordinates identifying the application range, the CPU 11 (the conveyance speed control portion) may make the conveyance speed of the platen 31, which is in front and behind of the application range, and the conveyance speed of the platen 31, on which the pretreatment agent is applying, different. For example, the CPU 11 (conveyance speed control portion) may control the conveyance speed of the platen 31 to the conveyance speed when the platen 31 is moved from the set position P1 to the application portion 40, or may control the conveyance speed to the maximum conveyance speed of the platen 31.

The CPU 11 determines whether the application of the pretreatment agent in the predetermined application range is complete (step S17). More specifically, when the application range is specified, the CPU 11 refers to the correspondence between each X coordinate of the platen 31 and the number of steps of at the end of the application of the X coordinate, which are stored in the storage unit 12, and determines whether the application of the pretreatment agent in the predetermined application range is complete. When the application range is not specified, the CPU 11 refers to the correspondence between the X coordinate of the rear end of the platen 31 and the number of steps of the application completion of the X coordinate, and determines whether the application of the pretreatment agent in the predetermined application range is complete. When it is not determined that the application of the pretreatment agent in the predetermined application range has been completed (no at step S17), the CPU 11 repeats the processing at step S17. When it is determined that the application of the pretreatment agent in the predetermined application range has been completed (yes at S17), the CPU 11 advances the process to step S19.

The detection portion 24 detects the position of the platen 31 (step S19). The CPU 11 determines whether the position of the platen 31 is the press position P3 on the basis of a signal from the detection portion 24 (step S21). More specifically, the CPU 11 makes the determination by comparing the number of steps of the platen motor 15 from the set position P1 with the number of steps of the press position P3 that is stored in the storage portion 12. When it is determined that the position of the platen 31 is not the press position P3 (no at step S21), the CPU 11 returns to the processing at step S19 and repeats the above-described processing. When it is determined that the position of the platen 31 is the press position P3 (yes at step S21), the CPU 11 stops the platen 31 (step S23). By controlling the heat press portion 50, the CPU 11 lowers the press surface 51 and starts the heat press operation on the cloth placed on the platen 31 (step S25).

The CPU 11 determines whether the heat press operation is complete (step S27). More specifically, when the heat press portion 50 has performed the heat press operation for the set heat press time period, the CPU 11 determines that the heat press operation is complete (yes at step S27). When it is determined that the heat press operation is not complete (no at step S27), the CPU 11 repeats the processing at step S27 and waits for the heat press operation to be complete. When it is determined that the heat press operation is complete (yes at step S27), the CPU 11 starts the movement of the platen 31 to the set position P1 (step S29).

The CPU determines whether the platen 31 has reached the set position P1 on the basis of the signal from the detection portion 24 (step S31). More specifically, when the sensor 13 detects the flap 38, it is determined that the platen 31 has reached the set position P1 (yes at step S31). When it is determined that the platen 31 has not reached the set position P1 (no at step S31), the CPU 11 repeats the processing at step S31 and waits for the platen 31 to reach the set position P1. When it is determined that the platen 31 has reached the set position P1 (yes at step S31), the CPU 11 stops the platen 31 (step S33) and returns to the processing at step S1. When it is determined that the platen 31 has reached the set position P1 (yes at step S31), the CPU 11 stops the platen 31 (step S33) and returns to the processing at step S1.

Spray Setting Processing

Figure 18:
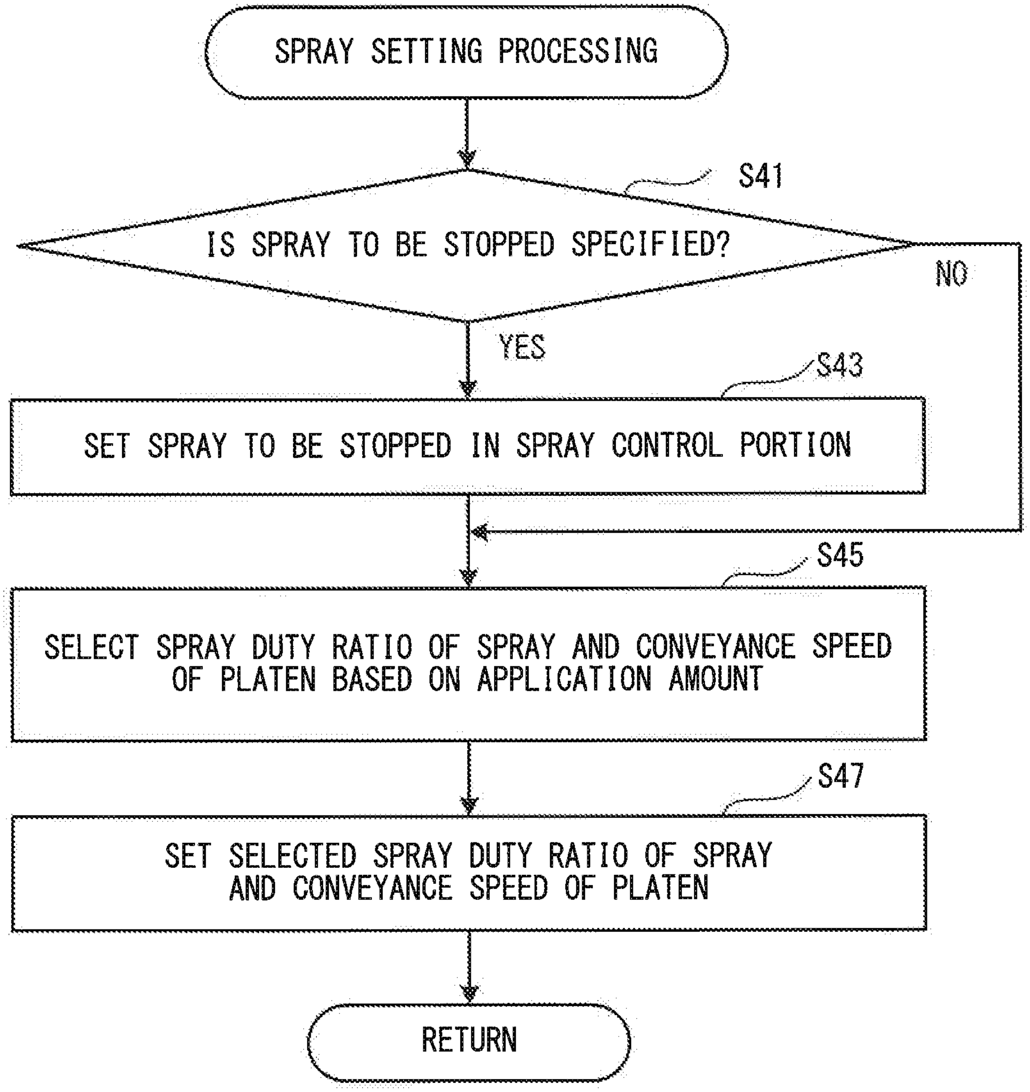
FIG. 18 is a flowchart of spray setting processing

A flow of the spray setting processing will be described with reference to FIG. 18. The spray setting processing is processing that corresponds to step S5 of the main processing.

The CPU 11 determines whether some of the sprays 41 to be stopped have been specified (step S41). More specifically, when the instruction of the operator includes the coordinates identifying the application range, if there is the spray 41 whose application section is outside the application range, the CPU 11 determines that some of the sprays 41 to be stopped have been specified (step S41). When the CPU 11 determines that none of the sprays 41 to be stopped has been specified (no at step S41), the processing advances to step S45. When the CPU 11 determines that some of the sprays 41 to be stopped have been specified (yes at step S41), the spray 41 to be stopped is set in the spray control portion (step S43).

The CPU 11 (the setting portion) sets the conveyance speed of the platen 31 and the spray duty ratio of the spray 41 on the basis of the coordinates identifying the application range and the application amount per unit area of the pretreatment agent (step S45). More specifically, when the coordinates identifying the application range and the application amount per unit area of the pretreatment agent have been specified, on the basis of the specified application amount, the CPU 11 (the setting portion) refers to the second table T2, and selects the combination of the conveyance speed of the platen 31 and the spray duty ratio of the spray 41. The CPU 11 (the setting portion) sets the selected conveyance speed of the platen 31 in the CPU 11, and also sets the selected spray duty ratio of the spray 41 in the CPU 11 (step S47). The CPU advances the processing to step S9 of the main processing.

Main Operations and Effects

According to the above-described embodiment, on the basis of at least one of the coordinates identifying the application range or the application amount of the pretreatment agent, the pretreatment device 10 selects the combination of the conveyance speed of the platen 31 and the spray duty ratio of the spray 41 that can realize the application of the pretreatment agent of the application amount per unit area of the default value or the specified value, and sets each of the conveyance speed of the platen 31 and the spray duty ratio of the spray 41. Thus, the pretreatment device 10 can apply the pretreatment agent of the appropriately specified application amount per unit area. Further, the operator can change the application amount in accordance with application conditions, such as a type of the cloth and a type of the pretreatment agent. Further, the preprocessing apparatus 10 can set the conveyance speed, so if the conveyance speed is increased, the pretreatment preprocessing time can be shortened.

According to the above-described embodiment, the pretreatment device 10 is provided with the storage portion 12 that stores the second table T2 that associates the application amount per unit area of the pretreatment agent with the combinations of the conveyance speed of the platen 31 and the spray duty ratio of the spray 41. The pretreatment device 10 sets the conveyance speed of the platen 31 and the spray duty ratio of the spray 41 on the basis of the second table T2. Thus, the pretreatment device 10 can set the conveyance speed of the platen 31 and the spray duty ratio of the spray 41 using a simple method.

According to the above-described embodiment, during the application of the pretreatment agent, the pretreatment device 10 controls the conveyance speed of the platen 31 to be the conveyance speed set by the CPU 11 (the setting portion), and at the same time, controls the spray duty ratio of the spray 41 to be the spray duty ratio set by the CPU 11 (the setting portion). Thus, the pretreatment device 10 can apply the pretreatment agent at the appropriately specified application amount per unit area.

According to the above-described embodiment, the pretreatment device 10 sets the conveyance speed of the platen 31 and the spray duty ratio of the spray 41 that can realize the application of the pretreatment agent at a specified optimum application amount per unit area. An optimum combination of the conveyance speed of the platen 31 and the spray duty ratio of the spray 41 is the most balanced combination in terms of the productivity and the displacement of the application region SA.

According to the above-described embodiment, the pretreatment device 10 is provided with the plurality of sprays 41 that are arranged side by side in the left-right direction, and when the pretreatment device 10 receives the application range via the operation portion 20 or the communication portion 23, the pretreatment device 10 stops the spray 41 having the application region SA positioned outside ends of the application range in the left-right direction with respect to the first direction. Since the pretreatment device 10 stops the spray 41 that sprays onto the outside of the application range in the left-right direction with respect to the first direction, waste of the pretreatment agent can be eliminated. Further, the pretreatment device 10 can shorten a treatment time compared with a case in which the pretreatment device 10 applies the pretreatment agent to the application range by moving the single spray 41.

According to the above-described embodiment, when the pretreatment device 10 receives the application range via the operation portion 20 or the communication portion 23, the pretreatment device 10 stops the spray 41 that sprays onto the outside of the application range in the left-right direction with respect to the second direction, and at the same time, stops all the sprays 41 that spray onto the outside of the application range with respect to the first direction. Since the pretreatment device 10 stops the spray 41 that sprays onto the outside of the application range in the left-right direction with respect to the first direction, and stops all the sprays 41 that spray onto the outside of the specified application range with respect to the first direction, the waste of the pretreatment agent can be eliminated. Further, the pretreatment device 10 can apply the pretreatment agent to the specified application range.

According to the above-described embodiment, the shape of the application region SA of the spray 41 is the elliptical shape. Compared with a case of a spray for in which the shape of the application region is circular, the pretreatment device 10 can apply the pretreatment agent to the cloth more evenly. In order to apply the pretreatment agent to the application range as evenly as possible, the sprays 41 are disposed at positions from which the sprays 41 can apply the pretreatment agent to the entire top surface of the platen 31, and the sprays 41 are disposed at positions at which the application regions SA of the sprays 41 do not overlap with each other in the left-right direction. Further, the shape of the application region SA of the spray 41 may be rectangular. In this case, since boundary lines between the application regions SA, which cause unevenness of the application, do not have any curved sections, the unevenness of the application does not occur. Thus, compared with a case in which the spray 41 has the circular application region SA whose boundary line is curved all round, the spray 41 that has the elliptical application region SA whose boundary line is partially curved can apply the pretreatment agent more evenly.

In the pretreatment device 10 of the above-described embodiment, the application portion 40 is disposed at a position separated from the set position in the first direction, and the heat press portion 50 is disposed at a position separated from the application portion 40 in the first direction. In other words, the heat press portion 50 is disposed such that the application portion 40 is sandwiched between the set position P1, at which the operator sets the cloth on the platen 31, and the heat press portion 50. Thus, in the pretreatment device 10 provided with the heat press portion 50, the operator can be distanced from the heat press portion 50 by the distance created as a result of sandwiching the application portion 40.

The platen 31 of the above-described embodiment can move in the up-down direction, and is provided with the contact portions 63A that receive the press pressure generated by the heat press by coming into contact with the platen 31 when the platen 31 is heat pressed by the heat press portion 50. Since the contact portions 63A receive the press pressure, the press pressure received by the guides 60 can be reduced. Thus, the rigidity of the guides 60 does not need to be strengthened as much as in the pretreatment device 10 that is not provided with the contact portions 63A. As a result, the pretreatment device 10 of the present embodiment can achieve both cost reductions or downsizing.

In the pretreatment device 10 of the above-described embodiment, the platen 31 is provided with the leg portions 32, and at the time of the heat press operation, the leg portions 32 come into contact with the contact portions 63A. Since the press pressure is received by the leg portions 32 and the contact portions 63 coming into contact with each other at the time of the heat press operation, the press pressure received by the guides 60 can be reduced. Thus, the rigidity of the guides 60 does not need to be strengthened as much as in the pretreatment device 10 that is not provided with the leg portions 32 and the contact portions 63A. As a result, the pretreatment device 10 of the present embodiment can achieve both cost reductions or downsizing.

In the pretreatment device 10 of the above-described embodiment, the number of the leg portions 32 of the platen 31 is four. Thus, when the platen 31 is heat pressed by the heat press portion 50, the platen 31 is supported at three or more points. As a result, a possibility of the platen 31 being tilted can be reduced.

The pretreatment device 10 of the above-described embodiment is provided with the urging member 39 that urges the platen 31 in the upward direction. In other words, since the platen 31 can move in the downward direction, when the application portion 40 applies the pretreatment agent onto the cloth, there is a possibility that the distance between the spray 41 and the cloth may change. Since the platen 31 is always being urged in the upward direction, it is easier to maintain the distance between the cloth and the spray 41 to be constant. Thus, it is possible to reduce a possibility of an application region SA being displaced as a result of the distance between the spray 41 and the cloth changing. Further, since the platen 31 is movable in the pressing direction when the platen 31 receives the press pressure, the contact portions 63A can reliably receive the press pressure.

In the pretreatment device 10 of the above-described embodiment, the plate-shaped porous member 31A is placed on the platen 31, and the cloth is placed on the porous member 31A. Further, a height from a support contact surface of the pretreatment device 10 to the cloth is set to be lower than a height of the press surface 51. Thus, even when the porous member 31A is placed on the platen 31 in order to improve the release of the steam resulting from the heat press operation, it is possible to prevent the cloth or the porous member 31A from being caught by the press surface 51 when the platen 31 is moved to the press position P3.

In the pretreatment device 10 of the above-described embodiment, the end portion 31B of the upper surface of the platen 31 or the end portion 51A of the press surface 51 is formed as a curved surface, and one of the upper surface of the platen 31 and the press surface 51 is larger than the other. When the cloth is heat pressed, a press mark is likely to be conspicuous along a boundary between a section of the cloth placed on the platen 31 and a section of the cloth that extends beyond the platen 31. However, the press mark becomes less conspicuous by forming the end portion 31B of the upper surface of the platen 31 or the end portion 51A of the press surface 51 to be the curved surface.

In the pretreatment device 10 of the above-described embodiment, the end portion 31B of the upper surface of the platen 31 is formed to be the tapered portion that is inclined downward (the press direction), or the end portion 51A of the press surface 51 is formed to be the tapered portion that is inclined upward (the opposite direction to the press direction), and one of the upper surface of the platen 31 and the press surface 51 is larger than the other. When the cloth is heat pressed, the press mark is likely to be conspicuous along the boundary between the section of the cloth placed on the platen 31 and the section of the cloth that extends beyond the platen 31. The press mark becomes less conspicuous by forming the end portion 31B of the upper surface of the platen 31 to be the tapered portion that is inclined downward, or by forming the end portion 51A of the press surface 51 to be the tapered portion that is inclined upward.

In the pretreatment device 10 of the above-described embodiment, when the platen 31 is positioned at the press position P3, the press surface 51 is larger than the platen 31 in all directions. Since the press surface 51 is larger than the platen 31 in all directions, when the pretreatment agent is applied to the cloth placed on the entire surface of the platen 31, the pretreatment device 10 can heat press the region to which the pretreatment agent has been applied in a single operation.

The pretreatment device 10 of the above-described embodiment is provided with the detection portion 24 that detects the position of the platen 31, and the heat press portion 50 moves the press surface 51 in the downward direction only when the detection portion 24 detects that the platen 31 is at the press position P3. Thus, it is possible to reduce a possibility of the heat press portion 50 performing the heat press operation in a state in which the platen 31 is not at the press position P3.

In the pretreatment device 10 of the above-described embodiment, the detection portion 24 includes the optical or mechanical sensor 13, and the first cover 61B is provided that is disposed on the upper portion of the sensor 13. Since the first cover 61B is disposed on the upper portion of the sensor 13, it is possible to reduce a possibility of the pretreatment agent applied by the application portion 40 attaching to the sensor 13 and causing the sensing function to deteriorate.

In the pretreatment device 10 of the above-described embodiment, the application portion 40 is housed in the second cover 40A that is provided with the four side surfaces and the upper surface. Since the application portion 40 is housed in the second cover 40A, the pretreatment device 10 can reduce a dispersion range of the pretreatment agent applied by the application portion 40.

Modified Examples

In the pretreatment device 10 of the above-described embodiment, the application amount of the pretreatment agent specified via the operation portion 20 or the communication portion 23 is the application amount per unit area. However, the specified application amount may be an application amount per a predetermined area, an application amount of the application range, and the like. In this case, it is sufficient that the application amount per unit area be calculated.

In the above-described embodiment, the pretreatment device 10 sets the combination of the conveyance speed of the platen 31 and the spray duty ratio of the spray 41 on the basis of the coordinates identifying the application range and the specified application amount. However, the pretreatment device 10 may set one of the conveyance speed of the platen 31 and the spray duty ratio of the spray 41 on the basis of at least one of the coordinates identifying the application range or the application amount, as specified via the operation portion 20 or the communication portion 23. When setting the conveyance speed of the platen 31, it is sufficient that the pretreatment device 10 set the conveyance speed of the platen 31 that can realize the application of the specified application amount or of the default application amount, on the basis of the application amount specified via the operation portion 20 or the communication portion 23, or the application amount of the default value. Further, when setting the spray duty ratio of the spray 41, it is sufficient that the pretreatment device 10 set the spray duty ratio of the spray 41 that can realize the application of the specified application amount or of the default application amount, on the basis of at least one of the coordinates identifying the application range or the application amount, as specified via the operation portion 20 or the communication portion 23.

The pretreatment device 10 may set the combination of the conveyance speed of the platen 31 and the spray duty ratio of the spray 41 on the basis of one of the coordinates identifying the application range and the application amount, as specified via the operation portion 20 or the communication portion 23. When only the coordinates identifying the application range are specified, the pretreatment device 10 may set the combination of the conveyance speed of the platen 31 and the spray duty ratio of the spray 41 by referring to the second table T2 on the basis of the default value of the application amount. Therefore, by setting the spray duty ratio, the pretreatment device 10 can more reliably perform the application based on the default value of the application amount of the pretreatment agent. Namely, the preprocessing apparatus 10 can change the application amount of a pretreatment agent. When the application amount per unit area of the pretreatment agent is specified, the pretreatment device 10 may set the combination of the conveyance speed of the platen 31 and the spray duty ratio of the spray 41 by referring to the second table T2, on the basis of the specified application amount. Therefore, by setting the spray duty ratio, the pretreatment device 10 can more reliably perform the application based on the specified application amount of the pretreatment agent. Namely, the preprocessing apparatus 10 can change the application amount of a pretreatment agent.

In the above-described embodiment, the pretreatment device 10 sets the conveyance speed of the platen 31 and the spray duty ratio of the spray 41 that can realize the application of the pretreatment agent of the specified optimum application amount per unit area. However, the pretreatment device 10 may set a combination that assigns priority to the productivity. In other words, the pretreatment device 10 may set the combination of the conveyance speed of the platen 31 and the spray duty ratio of the spray 41 having the fastest conveyance speed of the platen 31. Further, the pretreatment device 10 may set a combination that gives priority to the reduction of the displacement of the application region SA. In other words, the pretreatment device 10 may set the combination of the conveyance speed of the platen 31 and the spray duty ratio of the spray 41 having the slowest conveyance speed of the platen 31.

In the above-described embodiment, when there are the plurality of combinations corresponding to the application amount per unit area specified by the operator via the operation portion 20 or the communication portion 23, the pretreatment device 10 may display a list of the combinations on a display portion (not shown in the drawings) of the display portion 21 or the terminal device 30, and may allow the operator to set the combination. The operator can decide whether he/she gives priority to the productivity, the reduction of the displacement of the application region SA, or the balance between the productivity and the displacement of the application region SA, as he/she desires.

In the above-described embodiment, on the basis of the application amount, the pretreatment device 10 sets the combination of the conveyance speed of the platen 31 and the spray duty ratio of the spray 41 that is well-balanced in terms of the productivity and the displacement of the application region SA. However, a priority item may be specified in advance via the operation portion 20 or the communication portion 23. By specifying the priority item in advance, the pretreatment device 10 can set the combination of the conveyance speed of the platen 31 and the spray duty ratio of the spray 41 in accordance with the specified priority item.

Figure 19:
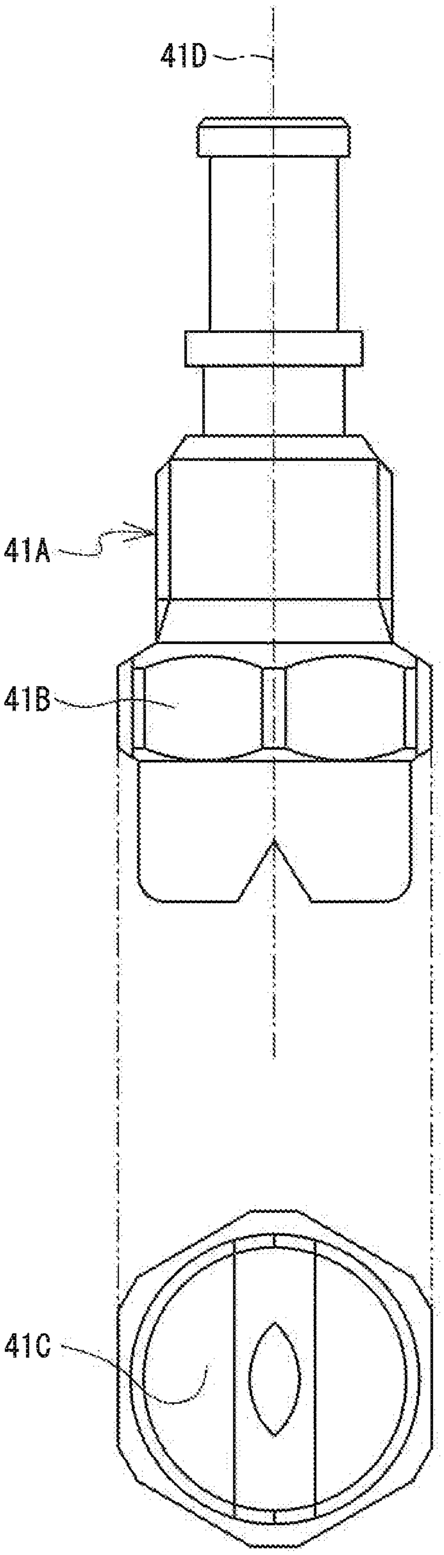
FIG. 19 is a diagram showing a nozzle removed from the spray.

In the above-described embodiment, each of nozzles 41A of the sprays 41 is connected to the flow channel through which the pretreatment agent is supplied from the tank. Each of the nozzles 41A connected to the flow channel may be removable. Further, as shown in FIG. 19, the nozzles 41A of the spray 41 may be provided with a leading end portion 41B, such that at least the leading end portion 41B, which includes a spray surface 41C that sprays the pretreatment agent, is removable. Since the nozzle 41A is removable from the flow channel, or the leading end portion 41B is removable from the flow channel, when the leading end portion 41B is worn out or damaged, the leading end portion 41B can be easily replaced.

In the above-described embodiment, the spray 41 may be a single fluid spray. FIG. 19 shows an example of the nozzle 41A that is the single fluid spray. Since the single fluid spray can reduce an amount of mist sprayed compared with a double fluid spray, the pretreatment device 10 can apply the pretreatment agent to the appropriate application region SA, and can prevent contamination inside the pretreatment device 10 resulting from the mist.

In the above-described embodiment, the spray 41 may be an air pressure-type spray. A component 40B shown in FIG. 1 is an air compressor for the air pressure type spray 41. When the air pressure type spray 41 is adopted, since high-pressure application can be made without pulsation, the pretreatment device 10 can reduce the amount of mist sprayed. Thus, the pretreatment device 10 can apply the pretreatment agent to the appropriate application region SA, and can prevent the contamination inside the pretreatment device 10 resulting from the mist.

Figure 20A:
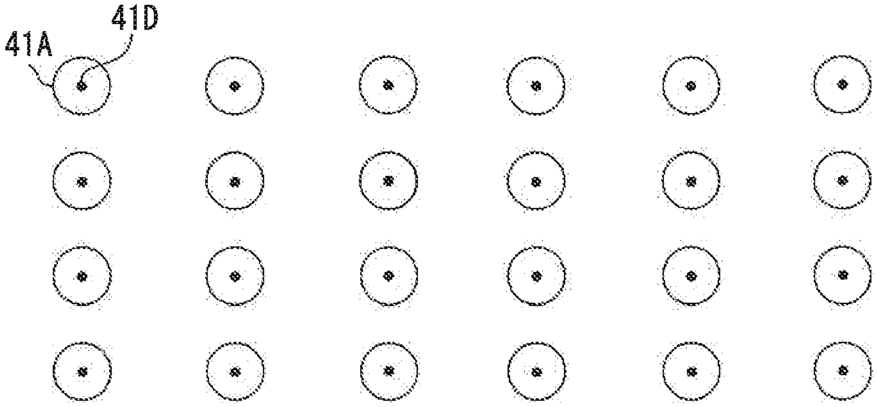
FIG. 20A is a diagram showing an example of an arrangement of the sprays.
Figure 20B:
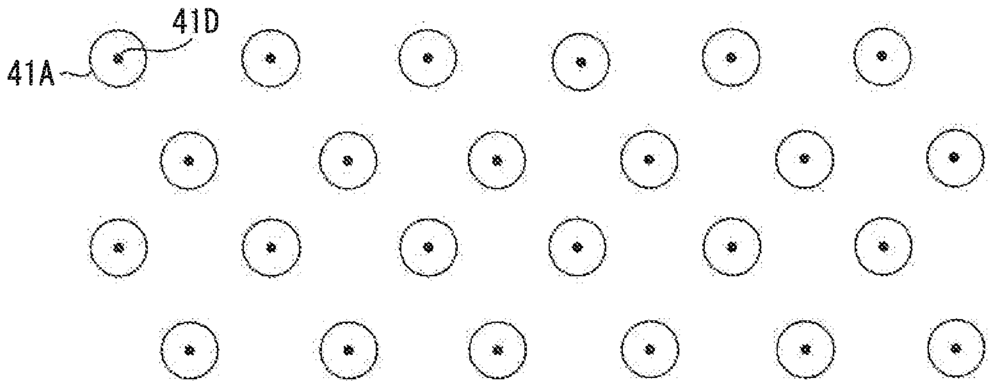
FIG. 20B is a diagram showing an example of the arrangement of the sprays.

In the above-described embodiment, the sprays 41 are arranged side by side in the left-right direction. However, the sprays 41 may be arranged side by side in the left-right direction and the first direction. FIG. 20A and FIG. 20B show attachment centers 41D of the nozzles 41A shown in FIG. 19. The reference numerals 41A and 41D are attached only to those on the upper left, but the other nozzles and the attachment centers are similar. In this case, even when the conveyance speed of the platen 31 is increased, the pretreatment device 10 can apply the pretreatment agent of the specified application amount or of the default application amount. Further, as shown in FIG. 20B, two of the nozzles 41A of the sprays 41 that are adjacent to each other in the first direction may be arranged so as to be displaced with respect to each other in a second direction that intersects the first direction. In this case, the application amount of the pretreatment agent sprayed from the two sprays 41 adjacent to each other in the first direction can be caused to be substantially even in the second direction. Further, the sprays 41 may be arranged in a row in the second direction. In this case, since the further the sprays 41 are arranged toward the first direction side, the sooner the sprays 41 reach the application range, it is sufficient that the pretreatment device 10 perform control so as to cause the sprays 41 to start spraying in an order in which the sprays 41 reach the application range. When the sprays 41 are arranged in a row in the second direction, the same effects can be achieved as in a case in which the sprays 41 are arranged side by side in the left-right direction.

Further, the sprays 41 may be alternately arranged in two rows in the second direction. In this case, the pretreatment device 10 can prevent the application region SA from becoming inaccurate due to an air flow from the adjacent sprays 41. Further, the sprays 41 may be alternatively arranged in two rows, and the minor axis of the elliptical application region SA of the pretreatment agent applied by each of the sprays 41 need not necessarily be in parallel with the first direction. In this case, the pretreatment device 10 can prevent the application region SA from becoming inaccurate due to the air flow from the adjacent sprays 41. Thus, it is possible to cause the application amount of the pretreatment agent sprayed by two of the sprays 41 that are adjacent to each other in the second direction to be substantially even in the second direction. It is preferable that all the sprays 41 have the same inclination angle of the minor axis of the elliptical application region SA with respect to the first direction. Further, as long as the sprays 41 can apply the pretreatment agent to the entire top surface of the platen 31 and are arranged at positions at which the application regions SA thereof do not overlap with each other in the left-right direction, the inclination angles may be different from each other.

In the above-described embodiment, the detection portion 24 is configured by the combination of the sensor 13 and the platen motor 15. However, the detection portion 24 may be provided with an encoder and may detect the position of the platen 31 on the basis of a feedback signal (a pulse signal) from the encoder. In this case, the platen motor 15 need not necessarily be the stepping motor.

In the above-described embodiment, the platen 31 includes the four leg portions 32. However, it is sufficient that the platen 31 includes at least one of the leg portions 32. In this case, it is sufficient that the contact portion 63A be disposed at a position facing each of the leg portions 32. Further, the contact portion 63A need not necessarily be provided. In this case, it is sufficient that the length of each of the leg portions 32 in the up-down direction be set such that each of the leg portions 32 can come into contact with the second base 63 at a position that does not exceed the downward movement limit of the platen 31 at the time of the heat press operation. Similarly, the platen 31 need not necessarily be provided with the leg portion 32. In this case, it is sufficient that the height of the contact portion 63A be set such that a back surface of the platen 31 can come into contact with each of the contact portions 63A at a position that does not exceed the downward movement limit of the platen 31 at the time of the heat press operation. The leg portion 32 need not necessarily be disposed at the end portion of the platen 31 as long as a position facing the leg portion 32 is positioned on the upper surface of the second base 63.

Further, the platen 31 may include two of the plate-shaped leg portions 32 that extend in the left-right direction and are disposed at the front end and the rear end of the platen 31, or in the vicinity of each of the front end and the rear end of the platen 31. The platen 32 may further include one or more of the plate-shaped leg portions 32 that extend in the left-right direction as well as the two plate-shaped leg portions 32 that extend in the left-right direction and are disposed at the front end and the rear end of the platen 31, or in the vicinity of each of the front end and the rear end of the platen 31. Further, the platen 31 may include a plurality of leg portions, each having the same shape as the leg portion 32 of the above-described embodiment, at left and right end portions of the back surface of the platen 31 as well as the two plate-shaped leg portions 32 that extend in the left-right direction and are disposed at the front end and the rear end of the platen 31, or in the vicinity of each of the front end and the rear end of the platen 31. In other words, it is sufficient that at least one of the contact portion 63A or the leg portion 32 have a configuration that can support the platen 31 while being disposed at a position that does not exceed the downward movement limit of the platen 31 at the time of the heat press operation.

In the above-described embodiment, the platen 31 moves in the up-down direction. However, the platen 31 may move in the left-right direction, and the platen 31 disposed at the set position P1, the application portion 40, and the heat press portion 50 may be disposed in this order in one of the left to right direction or the right to left direction. Even in this case, the heat press portion 50 is disposed at a position further separated from the set position P1 than the application portion 40. Thus, in the same manner, by distancing the heat press portion 50 from the set position P1, it is possible to distance the operator from the heat press portion 50.

In the above-described embodiment, the end portion 31B of the top surface of the platen 31 is formed as the curved surface or in the downwardly tapered shape. However, the end portion 31*b* of the platen 31 may be a combination of the curved surface and the tapered shape. Further, part of the end portion 31B of the top surface of the platen 31 may be the curved surface, and the remaining part of the end portion 31B may be formed in the tapered shape.

In the above-described embodiment, the press surface 51 is moved downward to heat press the cloth placed on the platen 31. However, a configuration may be adopted in which a drive mechanism to move the platen 31 in the up-down direction is provided, and the platen 31 may be moved upward so as to come into contact with the press surface 51 when the platen 31 is positioned at the press position P3.

In the above-described embodiment, the sensor 13 is disposed at a position at which the sensor 13 can detect the set position P1. However, the sensor 13 may be disposed at a position at which the sensor 13 can detect at least one of the set position P1, the application position P2, or the press position P3. In this case, as described above, it is preferable that the first cover 61B be disposed on the upper portion of the sensor 13. As described above, this is because it is possible to reduce the possibility of the sensing function deteriorating as a result of the pretreatment agent applied by the application portion 40 attaching to the sensor 13.

In the above-described embodiment, the heat press portion 50 is not surrounded by a cover. However, as shown in FIG. 15, a third cover (not illustrated in the drawings) may be provided that does not surround at least an upper portion of the heat press portion 50. Since at least the upper portion of the heat press portion 50 is not surrounded, the steam generated by the heat press operation can be discharged from an opening positioned in an upper portion of the third cover. Further, a third cover may be provided that is provided with four side surfaces facing the upper, lower, left, and right directions, and an upper surface, and a ventilation fan (not illustrated in the drawings) may be provided in a central section of the upper surface of the third cover. By the ventilation fan being provided, even when the heat press portion 50 is surrounded except for a lower portion thereof, the pretreatment device 10 can discharge the steam generated by the heat press operation to the outside using the ventilation fan. Further, by disposing the ventilation fan at a position facing a central section of the press surface 51, the pretreatment device 10 can efficiently discharge the steam to the outside.

Each of the drive mechanisms may be provided with a maintenance mode. The maintenance mode is a mode for checking whether the drive mechanism is appropriately driven at predetermined timings and the like, for example. By the maintenance mode being provided, a malfunction or a failure of the drive mechanism can be ascertained at an earlier stage.

The programs and the like to perform the main processing may be stored in a disk device or the like provided in a server device on the Internet, and the pretreatment device 10 may download various types of the programs, for example.

According to the embodiment or the modified examples, the pretreatment device 10 may use other types of storage device other than a ROM and a RAM. For example, the pretreatment device 10 may include a storage device, such as a CAM, a SRAM, an SDRAM or the like.

According to the embodiment or the modified examples, the electrical configuration of the pretreatment device 10 may be different from the configuration shown in FIG. 10. Other hardware having a standard/type other than that illustrated in FIG. 10 may be applied to the pretreatment device 10.

For example, the control portion of the pretreatment device 10 shown in FIG. 10 may be configured by a hardware circuit. More specifically, instead of the CPU 11, the control portion may be configured by a reconfigurable circuit such as a FPGA, an ASIC, or the like. The control portion may be configured by both the CPU 11 and the hardware circuit.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A pretreatment device comprising:

a platen;

a guide configured to guide a conveyance of the platen from a set position at which a recording medium is set on an upper surface of the platen;

a spray configured to spray a pretreatment agent onto the recording medium set on an upper surface of the platen before an ink that forms an image is applied from an inkjet printer;

an input portion into which is input at least one of an application range of the pretreatment agent onto the recording medium or an application amount of the pretreatment agent;

a processor; and a memory storing computer-readable instructions that, when executed by the processor, perform a process including:

setting, on the basis of at least a first factor and a second factor, at least one of a relative conveyance speed of the platen to the spray or a spray duty ratio that is a ratio of a spray time during a spray period of the pretreatment agent, the first factor being at least one of the application amount of the pretreatment agent to be sprayed from the spray input into the input portion, the second factor being a mode the pretreatment device is in, the mode including a first mode and a second mode, wherein the setting sets at least one of the relative conveyance speed or the spray duty ratio that is the ratio of the spray time during the spray period of the pretreatment agent to be sprayed from the spray for at least one of the application range of the pretreatment agent to be sprayed from the spray or the application amount input into the input portion and at least one of the set relative conveyance speed or the set spray ratio is different depending on whether the pretreatment device is in the first mode or the second mode.

2. The pretreatment device according to claim 1, wherein the application range and the application amount are input into the input portion, and the instructions further perform a process including:

setting the relative conveyance speed and the spray duty ratio on the basis of the application range and the application amount.

3. The pretreatment device according to claim 1, wherein the first mode prioritizes productivity and the second mode prioritizes image quality, and in the first mode, at least one of setting the relative conveyance speed greater than the relative conveyance speed in the second mode or setting the spray duty ratio greater than the spray duty ratio in the second mode is performed in the setting, in the second mode, at least one of setting the relative conveyance speed smaller than the relative conveyance speed in the first mode or setting the spray duty ratio smaller than the spray duty ratio in the first mode is performed in the setting.

4. The pretreatment device according to claim 1, wherein the relative conveyance speed is a speed when the platen is guided in a first direction by the guide and spray is not moved in the first direction.

5. A pretreatment method performed by a pretreatment device including a platen, a guide configured to guide a conveyance of the platen from a set position at which a recording medium is set on an upper surface of the platen, a spray configured to spray a pretreatment agent onto the recording medium set on an upper surface of the platen before an ink that forms an image is applied from an inkjet printer, an input portion into which is input at least one of an application range of the pretreatment agent onto the recording medium or an application amount of the pretreatment agent, a processor, a memory storing computer-readable instructions that, when executed by the processor, perform a process, and the pretreatment method comprising:

setting, on the basis of at least a first factor and a second factor, at least one of a relative conveyance speed of the platen to the spray or a spray duty ratio that is a ratio of a spray time during a spray period of the pretreatment agent, the first factor being at least one of the application range or the application amount of the pretreatment agent to be sprayed from the spray input into the input portion, the second factor being a mode the pretreatment device is in, the mode including a first mode and a second mode, wherein the setting sets at least one of the relative conveyance speed or the spray duty ratio that is the ratio of the spray time during the spray period of the pretreatment agent to be sprayed from the spray for at least one of the application range of the pretreatment agent to be sprayed from the spray or the application amount input into the input portion, and at least one of the set relative conveyance speed or the set spray ratio is different depending on whether the pretreatment device is in the first mode or the second mode.

* * * * *